US011801579B2

(12) United States Patent
Coperataro

(10) Patent No.: US 11,801,579 B2
(45) Date of Patent: Oct. 31, 2023

(54) MACHINING SYSTEM AND MONITORING METHOD

(71) Applicant: UNIVERSITÉ DU LUXEMBOURG, Esch-sur-Alzette (LU)

(72) Inventor: Edoardo Coperataro, Côte d'Eich (LU)

(73) Assignee: UNIVERSITÉ DU LUXEMBOURG, Luxembourg (LU)

(*) Notice: Subject to any disclaimer, the term of this patent is extended or adjusted under 35 U.S.C. 154(b) by 311 days.

(21) Appl. No.: 17/416,324

(22) PCT Filed: Dec. 23, 2019

(86) PCT No.: PCT/EP2019/086911
§ 371 (c)(1),
(2) Date: Jun. 18, 2021

(87) PCT Pub. No.: WO2020/128090
PCT Pub. Date: Jun. 25, 2020

(65) Prior Publication Data
US 2022/0072673 A1 Mar. 10, 2022

(30) Foreign Application Priority Data
Dec. 21, 2018 (LU) .................................. 101065

(51) Int. Cl.
B23Q 17/00 (2006.01)
B23Q 17/09 (2006.01)
(Continued)

(52) U.S. Cl.
CPC ........ B23Q 17/0971 (2013.01); B05B 7/1431 (2013.01); B05B 15/18 (2018.02);
(Continued)

(58) Field of Classification Search
CPC .............. B23Q 17/0971; B23Q 17/098; B05B 7/1431; B05B 15/18; B24C 1/045;
(Continued)

(56) References Cited

U.S. PATENT DOCUMENTS 4,734,861 A 3/1988 Bertolasi et al.
4,744,242 A 5/1988 Anderson et al.
(Continued)

FOREIGN PATENT DOCUMENTS

EP 3 290 156 A2 3/2018
EP 3 292 929 A1 3/2018
(Continued)

OTHER PUBLICATIONS

Baydar & Ball, "Detection of Gear Failures via Vibration and Acoustic Signals Using Wavelet Transform," Mechanical Systems and Signal Processing 17(4), pp. 787-804 (2003).
(Continued)

Primary Examiner — Ojiako K Nwugo
(74) Attorney, Agent, or Firm — Foley & Lardner LLP

(57) ABSTRACT

The invention provides a machining system (201) comprising: a machining apparatus (202), notably an abrasive waterjet cutting system (203), said machining apparatus being adapted for machining a workpiece (204); a monitoring device (228) adapted for monitoring machining conditions of the machining apparatus (202) and/or of the workpiece, the monitoring device comprising a plurality of sensors, said plurality of sensors comprising a first sensor (237) at a first location and a second sensor (239) at a second location which is distant from the first location. The plurality of sensors comprises a fourth sensor (243) which is formed by an array of microphones (254) arranged on a grid. The plurality of sensors comprises accelerometers, strain gauges and microphones. The invention also provides a monitoring
(Continued)

method of a machining system (201) wherein a specific benchmark signature is chosen from a library.

21 Claims, 11 Drawing Sheets

(51) Int. Cl.
| | |
|---|---|
| B05B 15/18 | (2018.01) |
| B05B 7/14 | (2006.01) |
| B24C 1/04 | (2006.01) |
| B24C 5/04 | (2006.01) |
| H04R 1/40 | (2006.01) |
| H04R 29/00 | (2006.01) |

(52) U.S. Cl.
CPC ............ *B23Q 17/098* (2013.01); *B24C 1/045* (2013.01); *B24C 5/04* (2013.01); *H04R 1/406* (2013.01); *H04R 29/005* (2013.01); *H04R 2201/401* (2013.01); *H04R 2201/405* (2013.01)

(58) Field of Classification Search
CPC ........ B24C 5/04; H04R 1/406; H04R 29/005; H04R 2201/401; H04R 2201/405
See application file for complete search history.

(56) References Cited

U.S. PATENT DOCUMENTS

| | | | |
|---|---|---|---|
| 4,980,844 A | 12/1990 | Demjanenko et al. | |
| 5,176,053 A | 1/1993 | Alvelid et al. | |
| 5,320,289 A * | 6/1994 | Hashish | B24C 9/00 239/434 |
| 5,791,968 A * | 8/1998 | Matsumura | B24C 9/003 451/5 |
| 7,544,112 B1 * | 6/2009 | Miller | B24C 9/00 451/75 |
| 9,744,645 B2 * | 8/2017 | Miller | B24C 11/005 |
| 9,815,175 B2 * | 11/2017 | Miller | B24C 11/005 |
| 2007/0028972 A1 * | 2/2007 | Gadd | B24C 1/045 137/625.46 |
| 2015/0196989 A1 * | 7/2015 | Hashish | B24C 7/0076 83/53 |
| 2015/0266161 A1 * | 9/2015 | Noda | B24C 1/045 700/160 |
| 2016/0091398 A1 | 3/2016 | Pluemer | |
| 2017/0238101 A1 | 8/2017 | Spiegelberg et al. | |
| 2018/0015638 A1 * | 1/2018 | Uchida | B24B 55/02 |
| 2018/0021922 A1 * | 1/2018 | Linde | B24C 1/045 451/2 |
| 2019/0209266 A1 * | 7/2019 | Moon | B23Q 11/10 |
| 2022/0009055 A1 * | 1/2022 | Copertaro | B24C 1/045 |

FOREIGN PATENT DOCUMENTS

| | | |
|---|---|---|
| EP | 3 336 536 A1 | 6/2018 |
| FR | 2699852 A1 | 7/1994 |
| WO | WO-92/20456 A1 | 11/1992 |
| WO | WO-2004/076075 A1 | 9/2004 |

OTHER PUBLICATIONS

Chiariotti, et al., "Acoustic beamforming for noise source localization—Reviews, methodology and applications," Mechanical Systems and Signal Processing 120, pp. 422-448 (2019).

International Search Report & Written Opinion for PCT/EP2019/086911 dated Feb. 25, 2020, 12 pages.

Kadlec, et al., "Data-driven Soft Sensors in the process industry," Computers & Chemical Engineering 33(4), pp. 795-814 (2009).

Maia, et al., "Damage detection and quantification using transmissibility," Mechanical Systems and Signal Processing 25(7), pp. 2475-2483 (2011).

Ming, et al., "Weak fault feature extraction of rolling bearing based on cyclic Wiener filter and envelope spectrum," Mechanical Systems and Signal Processing 25(5), pp. 1773-1785 (2011).

Van Der Seijs, et al., "General framework for transfer path analysis: History, theory and classification of techniques," Mechanical Systems and Signal Processing 68-69, pp. 217-244 (2016).

Wang, et al., "Constrained independent component analysis and its application to machine fault diagnosis," Mechanical Systems and Signal Processing 25(7), pp. 2501-2512 (2011).

Zhang, et al., "Adaptive parameter blind source separation technique for wheel condition monitoring," Mechanical Systems and Signal Processing 90, pp. 208-221 (2017).

\* cited by examiner

MACHINING SYSTEM AND MONITORING METHOD

CROSS-REFERENCE TO RELATED APPLICATIONS

This application is a U.S. National Phase Application of PCT Application No. PCT/EP2019/086911, filed Dec. 23, 2019, which claims priority to and benefit of Luxembourg Application No 101065, filed, Dec. 21, 2018, the entire disclosures of which are incorporated herein by reference.

TECHNICAL FIELD

The invention deals with the monitoring of a machining apparatus. More precisely, the invention concerns a system and a method for monitoring a machining apparatus, notably an abrasive waterjet cutting machine. The invention also provides a computer program, a computer program product and a computer.

BACKGROUND OF THE INVENTION

Abrasive waterjet technology permits to cut hard materials such as alloys and stones. This manufacturing process is peculiarly interesting since it does not heat the workpiece during cutting operations. Thus, it does not affect the intrinsic properties of the material along the cutting contour. This benefit is highly appreciated in the aeronautic domain where homogeneous material properties are closely connected to reliability. In addition, the precision and the quality of the produced goods reach high standards.

This manufacturing technology requires a high-pressure water source and an abrasive medium, notably particles made of hard material. High-pressure water is accelerated through an orifice, resulting in a high-speed water jet. Particles are fed into a mixing chamber. The resulting mixture is driven through a focusing tube, also known as "nozzle", where momentum transfer from water jet to particles occurs, the latter being consequently accelerated. The nozzle also possesses a collimator function. At the outlet, the mixture forms a cutting flow that progressively erodes the workpiece due to repeated collisions of the abrasive particles.

During operation, an abrasive waterjet cutting (AWC) system generally generates dusts, vibrations, acoustic energy, and projections. Some of these parameters are conveniently used by monitoring devices for controlling the cutting operation, controlling the workpiece quality and performing diagnostics of the AWC system. For instance; the wear state of the nozzle may be estimated. Similar estimations may be carried out with respect to the orifice of the high-pressure fluid source. A misalignment may also be detected. The acoustic contributions generated from the workpiece may be exploited for the purpose of in-line quality control and product assurance.

For these purposes, different kinds of sensors may be used. However, the latter remain exposed to the severe environment conditions that may damage them and/or compromise the monitoring accuracy. Moreover, the known monitoring devices remain of reduced relevance and provide limited info with regard to overall functioning if not properly framed within an integrated monitoring infrastructure, as well as supported with dedicated data analysis. For example, new sensing capabilities might be enabled by using an array of microphones instead of a standalone. The same consideration applies to the inclusion of several accelerometers into a distributed and integrated network, instead of using them as standalone devices, one separated from the others.

Technical Problem to be Solved

It is an objective of the invention to present an abrasive waterjet cutting system which overcomes at least some of the disadvantages of the prior art. In particular, it is an objective of the invention to improve the monitoring accuracy of a machining apparatus and enable new sensing capabilities.

SUMMARY OF THE INVENTION

According to a first object, the invention provides a machining system comprising: a machining apparatus, notably a cutting machine, said machining apparatus being adapted for machining a workpiece; a monitoring device adapted for monitoring machining conditions of the machining apparatus and/or the workpiece, the monitoring device comprising a plurality of sensors, said plurality of sensors comprising a first sensor at a first location and a second sensor at a second location which is distant from the first location.

Preferably, the first sensor may comprise a first accelerometer sensor, the second sensor may comprise a second accelerometer sensor, the plurality of sensors possibly further comprising a third or further accelerometer sensors at a third or further locations which are distant from the first location and the second location, and possibly a fourth accelerometer sensor intended to be in contact of the workpiece.

Preferably, the first sensor may comprise a first strain gauge sensor, the second sensor may comprise a second strain gauge sensor, the plurality of sensors possibly further comprising a third or further strain gauge sensors at a third or further locations which are distant from the first location and the second location, and possibly a fourth strain gauge sensor intended to be in contact of the workpiece.

Preferably, the first sensor may comprise a first microphone sensor, the second sensor may comprise a second microphone sensor, the plurality of sensors possibly further comprising a third or further sensors which may be at a third or further locations which may be distant from the first location and the second location.

Preferably, the first sensor may comprise a first microphone sensor, the second sensor may comprise a second microphone sensor, the plurality of sensors possibly further comprising a further sensor configured for measuring acoustic emissions from the workpiece and which is at a third location which is distant from the first location and the second location.

Preferably, the first sensor may comprise a first accelerometer or a strain gauge sensor, the second sensor may comprise a second accelerometer or strain gauge sensor, the plurality of sensors possibly further comprising an array of microphones which is at another location which is distant from the first location and the second location.

Preferably, the plurality of sensors may further comprise an array of fourth microphones sensors adapted for monitoring machining conditions of the machining apparatus.

Preferably, the array of fourth microphones sensors may form a rectangular and/or planar array of fourth microphones sensors.

Preferably, the array may comprise a grid supporting the fourth microphones sensors.

Preferably, the plurality of sensors may further comprise an array of microphones, optionally of fourth microphones, facing the machining apparatus, optionally at a distance of at most one meter.

Preferably, the array may comprise an outer frame, said frame optionally being planar, and optionally with a circular or a rectangular shape.

Preferably, the frame may comprise a size of at least one meter.

Preferably, the frame may support and internal planar grid, optionally with a planar shape.

Preferably, the grid may comprise several locations configured for positioning and orientating in space the microphones of the array.

Preferably, the fourth microphones may form a pattern, optionally on said grid, the pattern comprising a rectangle and/or a spiral; or the microphone of the array may be randomly distributed, optionally on said grid.

Preferably, said positions may defined patterns, notably a regular pattern, or a random distribution.

Preferably, the array of microphones may provide a set of N array signals.

Preferably, the machining apparatus may comprise a guide for cutting means, the first location may be at a first distance from the guide, and the second location may be at a second distance from the guide; the second distance being at least two times larger than the first distance, possibly at least ten times larger, or at least fifteen times larger.

Preferably, the machining apparatus may be at least one of: an abrasive waterjet cutting system, a milling machine, a lathe machine, a press machine, a sparkplug machining apparatus.

It is another object of the invention to provide a monitoring method of a machining system which comprises: a machining apparatus, notably a cutting machine, adapted for machining a workpiece; a monitoring device which monitors machining conditions of the workpiece and/or the machining apparatus, the monitoring device comprising a plurality of sensors, said plurality of sensors comprising a first sensor at a first location, a second sensor at a second location distant from the first location, possibly additional sensors at additional locations and possibly an array of microphones which provide a first signal, a second signal and possibly additional signals and possibly array signals respectively; the monitoring method comprising the steps of: defining a first signature, notably a first benchmark signature, at least on the basis of the first signal and notably the second signal; machining the workpiece; measuring the machining conditions of the workpiece and/or of the machining apparatus by means of the plurality of sensors; computing a second signature at least on the basis of a first signal and notably the second signal measured during step machining; comparing the first signature against the second signature, the machining apparatus being notably in accordance with any one of the invention.

Preferably, the waterjet cutting machine may be an abrasive waterjet cutting system.

Preferably, the plurality of sensors may comprise a first set of sensors and a second set of sensors which are at distance from each other.

Preferably, the plurality of sensors may comprise MEMS (Micro Electro Mechanical System) sensors.

Preferably, the machining apparatus may comprise a cutting tool adapted for engaging the workpiece, at least one sensor of the plurality of sensors may be in contact on said cutting tool.

Preferably, the plurality of sensors may comprise a sensor adapted for sensing vibrations or acoustic emissions of the workpiece.

Preferably, the plurality of sensors may comprise an array of microphones adapted for sensing acoustic emissions of the workpiece and the machining apparatus.

Preferably, the array of microphones may provide a set of array signals, one per each array microphone.

Preferably, the first location may be within the machining apparatus, and the second location may be outside the machining apparatus.

Preferably, the plurality of sensors may comprise accelerometers sensors, notably at distance from one another.

Preferably, the plurality of sensors may comprise microphone sensors.

Preferably, the microphone sensors may be at distance from one another.

Preferably, the machining apparatus may be a waterjet cutting machine with a nozzle and/or an orifice, the first sensor and the second sensor may comprise accelerometers in contact of the nozzle and of the orifice respectively, the plurality of sensors may further comprise a third accelerometer sensor in contact of the nozzle, and possibly a fourth accelerometer sensor intended to be in contact of the workpiece.

Preferably, the machining apparatus may comprise a cutting area, the first location is at a first distance from the cutting area, and the second location is at a second distance from the cutting area.

Preferably, the array of microphones may be oriented horizontally or vertically.

Preferably, the array of microphones may comprise at least ten microphones arranged on the array grid according to a certain pattern, notably spiral, regular or random.

Preferably, the further sensor may be a third microphone sensor which may be at distance from the first microphone sensor and of the second microphone sensor.

Preferably, the fourth microphone sensor may be at distance from the first microphone sensor and of the second microphone sensor.

Preferably, the guide and/or the first vibration source may be a nozzle.

Preferably, the first sound source may be a waterjet exiting from the nozzle.

Preferably, the second vibration source may be an orifice.

Preferably, the second sound source may be a pump.

Preferably, the machining apparatus may comprise a first vibrating component, a second vibrating component and a third or further vibrating components. The first sensor may comprise a first accelerometer sensor in contact of the first vibrating component, the second sensor may comprise a second accelerometer sensor in contact of the first vibrating component or of the second vibrating component.

Preferably, the plurality of sensors may further comprise a third or further accelerometer sensors in contact of the second vibrating component or of the first vibrating component or of the third or further vibrating components, and the plurality of sensors may further comprise a fourth accelerometer sensor intended to be in contact of the workpiece.

Preferably, the machining apparatus may comprise a first vibrating component, a second vibrating component and a third or further vibrating components, the first sensor may comprise a first strain gauge sensor in contact of the first vibrating component, the second sensor may comprise a second strain gauge sensor in contact of the first vibrating component or of the second vibrating component, the plurality of sensors may further comprise a third or further strain gauge sensors in contact of the second vibrating component or of the first vibrating component or of the third or further vibrating components, and, the plurality of sensors may further comprise a fourth strain gauge sensor intended to be in contact of the workpiece.

Preferably, the machining apparatus may comprise a first sound source, a second sound source and a third or further acoustic sources, the first sensor may comprise a first microphone sensor which may be closer to the first sound source than the second sensor, the second sensor may comprise a second microphone sensor which may be closer to the second sound source than the first microphone sensor, the plurality of sensors may further comprise a third or further sensors.

It is another object of the invention to provide a monitoring method of a machining system which comprises: a machining apparatus, notably a cutting machine, adapted for machining a workpiece; a monitoring device which monitors machining conditions of the workpiece and/or the machining apparatus, the monitoring device comprising a plurality of sensors, said plurality of sensors comprising a first sensor at a first location, a second sensor at a second location distant from the first location and possibly additional sensors at additional locations and possibly an array of microphones which provide a first signal, a second signal and possibly additional signals and possibly array signals respectively; the monitoring method comprising the steps of: defining a first signature, notably a first benchmark signature, at least on the basis of the first signal and notably the second signal; machining the workpiece; measuring the machining conditions of the workpiece and/or of the machining apparatus by means of the plurality of sensors; computing a second signature at least on the basis of a first signal and notably the second signal measured during step machining; comparing the first signature against the second signature, the machining system being notably in accordance with the invention.

Preferably, step defining a first signature may comprise the computing operation of step computing a second signature, and possibly additionally comprises a numerical data.

Preferably, during step computing a second signature, the first signal and the second signal and possibly additional signals and array signals may be continuously provided, step computing a second signature and/or step defining a first signature using at least: a first portion of finite length of the first signal, and notably a second portion of finite length of the second signal, the first portion and the second portion start at the same time and have a same time length.

Preferably, the plurality of sensors may comprise accelerometers, notably the first accelerometer sensor to the fourth accelerometer sensor, forming pairs of accelerometers, step computing and step defining comprising calculation of the vibration transmissibilies between the accelerometers of the pairs of accelerometers, said vibration transmissibilies being arranged in an N*N matrix, wherein N corresponds to the number of accelerometers in the plurality of sensors, said vibration transmissibilies being part of the first signature and of the second signature.

Preferably, the plurality of sensors may comprise strain gauges, notably the first strain gauge sensor to the fourth strain gauge sensor, forming pairs of strain gauges, step computing and step defining comprising calculation of the vibration transmissibilies between the strain gauges of the pairs of strain gauges, said vibration transmissibilies being arranged in an N*N matrix, wherein N corresponds to the number of accelerometers in the plurality of sensors, said vibration transmissibilies being part of the first signature and of the second signature.

Preferably, the machining apparatus may comprise a cutting tool with a cutting edge, the plurality of sensors comprising a tool sensor providing a tool signal, the tool signal from said tool sensor being used during step defining and during step computing for the first signature and for the second signature.

Preferably, the plurality of sensors may comprise a workpiece sensor providing a workpiece signal which is used during step defining and during step computing for the first signature and the second signature.

Preferably, step computing and/or step defining may comprise the calculation of the Fourier Transform or the Wavelet Transform of the first signal and the second signal, or of each signal from the plurality of sensors, said Fourier Transform or Wavelet Transform of each signal from the plurality of sensors being part of the first signature and of the second signature; before step calculation the first signal and the second signal, or each signal from the plurality of sensors, are possibly filtered with an anti-leakage filter and/or an anti-aliasing filter in order to provide filtered signals.

Preferably, at least the first sensor and the second sensor may comprise microphones, step computing and step defining comprising calculation of a clean signal, possibly of the first signal through a blind separation technique.

Preferably, the plurality of sensors may comprise N array microphones that may provide N array signals, step computing and step defining may comprise the computation of a N×N cross-spectral matrix from the N array signals.

Preferably, the cross-spectral matrix may be used for localizing, isolating and characterizing acoustic sources by means of acoustic beamforming methods.

Preferably, the plurality of sensors may comprise an array of microphones providing an array of signals, step computing and step defining comprising an acoustic beamforming technique for space localization and characterization of acoustic sources on a computation grid, said computation grid may correspond to the work plan of the machining apparatus.

Preferably, the plurality of sensors may comprise accelerometer sensors and microphone sensors, and possibly strain gauge sensors, providing a plurality of signals, the first signature and the second signature being each computed by means of said plurality of signals.

Preferably, during step comparing, a potential deviation between the first signature and the second signature may be analysed, notably by a control logic of the monitoring device.

Preferably, the method may comprise a training period during which machining conditions of the machining apparatus and/or the workpiece may be changed in order to change the first signal and the second signal, and in order to create a library of first benchmark signatures from which said first signature is part, the first benchmark signatures of the library may be defined at least on the basis of the first sensor and notably the second sensor.

Preferably, the method may further comprise step selecting a first benchmark signature from the library, the selected first benchmark signature of the library being the one with the smallest difference between its machining conditions and the machining conditions corresponding to the second signature and/or between features of the first signature and features of the second signature.

Preferably, the machining apparatus may comprise a set of sound sources, the plurality of sensors comprising one microphone sensor for each sound source of the set, the plurality of sensors may further comprise a workpiece microphone sensor configured for measuring acoustic emissions from the workpiece.

Preferably, the machining apparatus may comprise a first sound source, the first sensor may comprise a first microphone sensor which may be closer to the first sound source than the second sensor.

Preferably, the machining apparatus may comprise a set of vibrating components, the plurality of sensors may comprise at least one strain gauge sensor in contact of each vibrating component of the set of vibrating components, the plurality of sensors may comprise a workpiece strain gauge sensor intended to be in contact of the workpiece.

Preferably, the machining apparatus may comprise a first vibrating component, the first sensor may comprise a first strain gauge sensor in contact of the first vibrating component.

Preferably, the machining apparatus may comprise a set of vibrating components, the plurality of sensors may comprise at least one accelerometer sensor in contact of each vibrating component of the set of vibrating components, the plurality of sensors may comprise a workpiece accelerometer sensor intended to be in contact of the workpiece. Preferably, the machining apparatus may comprise a first vibrating component, the first sensor may comprise a first accelerometer sensor in contact of the first vibrating component.

It is another object of the invention to provide a computer program comprising computer readable code means, which when run on a computer, cause the computer to run the monitoring method according to the invention.

It is another object of the invention to provide a computer program product including a computer readable medium on which the computer program according to the invention is stored.

It is another object of the invention to provide a computer configured for carrying out the monitoring method according to the invention.

It is another object of the invention to provide an abrasive waterjet cutting system including: an abrasive waterjet cutting head comprising: a nozzle adapted for guiding an abrasive waterjet intended to cut a workpiece, notably a metallic workpiece, said nozzle including an inlet end and an outlet end; an abrasive waterjet flow direction; a monitoring device including at least an upstream sensor and a downstream sensor which are distributed along the abrasive waterjet flow direction downstream the inlet end of the nozzle, and which are adapted for measuring at least one wear characteristic of the nozzle or a characteristic of the abrasive waterjet, or an alignment characteristic of the nozzle with an orifice; the wear monitoring device being configured to monitor at least one characteristic of the abrasive waterjet cutting system through at least the upstream sensor and the downstream sensor.

Preferably, the upstream sensor and the downstream sensor may include an upstream accelerometer and a downstream accelerometer which may be attached to the abrasive waterjet cutting head for measuring wear characteristics of the nozzle and/or misalignment of waterjet respect to nozzle, notably for measuring vibrations of the nozzle. Preferably, the abrasive waterjet cutting head may include a casing housing the nozzle, said casing notably including pockets where the upstream accelerometer and the downstream accelerometer are arranged.

Preferably, the nozzle may include an inlet section forming the inlet end and receiving the upstream accelerometer, and an outlet section forming the outlet end and receiving the downstream accelerometer; preferably the inlet section and the outlet section may each extend along at most 20% of the length of the nozzle, more preferably along at most 10% of the length of the nozzle.

Preferably, the nozzle may include a tubular body with a cylindrical tubular external surface, the upstream accelerometer and the downstream accelerometer possibly being in contact of said tubular body, notably through glue or adhesive.

Preferably, the upstream sensor and the downstream sensor may include an upstream microphone and a downstream microphone disposed downstream the nozzle.

Preferably, the abrasive waterjet cutting head may include a frame supporting the upstream microphone and the downstream microphone.

Preferably, the monitoring device may further include a piezoelectric sensor which is intended to be fixed to the workpiece, the wear monitoring device may be configured to monitor at least one characteristic of the abrasive waterjet cutting system through the piezoelectric sensor.

Preferably, along the abrasive waterjet flow direction, the abrasive waterjet cutting system may include a first distance $D1$ between the outlet end and the upstream microphone, and a second distance $D2$ between the upstream microphone and the downstream microphone, said second distance $D2$ being greater than the first distance $D1$, preferably at least two times as great as the first distance $D1$.

Preferably, the abrasive waterjet cutting head may comprise a main support and reversible fixation means for fixing the upstream sensor and the downstream sensor to the main support.

Preferably, the abrasive waterjet cutting head may enclose an orifice which is coaxial with the nozzle and an orifice sensor, notably a strain-gauge sensor, for measuring a fluid pressure upstream the orifice.

Preferably, the upstream sensor and the downstream sensor may form a first set of sensors, the monitoring device further including a second set of sensors with a second upstream sensor and a second downstream sensor which may be adapted for measuring a wear characteristic of the nozzle and/or a characteristic of the abrasive waterjet, and/or an alignment characteristic of the nozzle with an orifice.

Preferably, the monitoring device may include a distance $D3$ along the abrasive waterjet flow direction which separates the first set of sensors from the second set of sensors.

Preferably, the sensors of the first set may be of a different kind than the sensors of the second set.

Preferably, the upstream sensor and the downstream sensor may be at opposite ends of the nozzle.

Preferably, the casing may be fixed to the main support through the reversible fixation means.

Preferably, the upstream sensor and the downstream sensor may be of the same kind.

Preferably, the first set and the second set may be diametrically opposite with respect to the abrasive waterjet, and/or on the other circumferential side" of the waterjet.

Preferably, at least one or each accelerometer may be configured for measuring vibrations in three directions.

Preferably, the system may exhibit a cutting stage downstream the nozzle, the microphones being arranged in said cutting stage.

Preferably, the system may include a nozzle stage enclosing the nozzle, a cutting stage notably between the nozzle and a workpiece receiving area, a monitoring zone optionally enclosing the nozzle stage and the cutting stage, the sensors may be arranged in the monitoring zone.

Preferably, the accelerometers may be arranged upstream at least one microphone, and/or between the strain-gauge sensor and at least one microphone, and/or between the strain-gauge sensor and the set of microphones.

Preferably, the abrasive waterjet cutting head may further include a mixing chamber upstream the upstream sensor, notably the upstream accelerometer.

Preferably, the nozzle may include a conical recess communicating with the mixing chamber. Preferably, the piezoelectric sensor may be disposed downstream the microphones.

Preferably, the plurality of sensors may further comprise an array of microphones configured for facing the abrasive waterjet cutting head and/or the workpiece, optionally at a distance of at most one meter.

It is another object of the invention to provide an abrasive waterjet cutting system including:
an abrasive waterjet cutting head comprising:
a nozzle adapted for guiding an abrasive waterjet intended to cut a workpiece, notably intended to cut a metallic workpiece, said nozzle including:
an inlet end,
an outlet end, and
a longitudinal direction;
a workpiece reception area;
a monitoring zone projecting from the workpiece reception area to the inlet end;
a wear monitoring device including:
an upstream sensor and a downstream sensor which are arranged in the monitoring zone,
and a longitudinal separation between the upstream sensor and the downstream sensor;
the wear monitoring device being configured to monitor the abrasive waterjet cutting system through the upstream sensor and the downstream sensor.

It is another object of the invention to provide an abrasive waterjet cutting system including:
an abrasive waterjet cutting head comprising:
a nozzle intended to be in contact of an abrasive waterjet adapted for cutting a workpiece, notably a metallic workpiece, said nozzle including:
an inlet section, and
an outlet section;
an orifice upstream the nozzle;
the system further including an alignment monitoring device for controlling the alignment of the orifice with respect to the nozzle, the misalignment monitoring device including an upstream accelerometer in contact of the upstream section of the nozzle.

It is another object of the invention to provide an abrasive waterjet cutting system including:
an abrasive waterjet cutting head comprising:
a nozzle for guiding an abrasive waterjet adapted for cutting a workpiece, notably adapted for cutting a metallic workpiece, said nozzle including:
an inlet section, and
an outlet section which are at opposite ends of the nozzle;
an abrasive waterjet flow direction; and
a monitoring device, notably a nozzle wear monitoring device, including:
an upstream accelerometer in contact of the upstream section and
a downstream accelerometer in contact of the downstream section of the nozzle,
the monitoring device being configured to monitor the abrasive waterjet cutting system by means of the upstream accelerometer and the downstream accelerometer.

It is another object of the invention to provide an abrasive waterjet cutting system including:
an abrasive waterjet cutting head comprising:
a nozzle for guiding an abrasive waterjet adapted for cutting a workpiece, notably adapted for cutting a metallic workpiece, said nozzle including:
an inlet section, and
an outlet section;
an abrasive waterjet flow direction;
a monitoring device, notably a jet quality monitoring device, including:
an upstream microphone,
a downstream microphone, and possibly
a workpiece sensor, notably a piezoelectric sensor, intended to be fixed to the workpiece,
the microphones, and possibly the workpiece sensor, are arranged downstream the nozzle, the upstream microphone being nearer from the outlet section than the downstream microphone and possibly than the workpiece sensor,
the monitoring device being configured to monitor the abrasive waterjet cutting system through the microphones and possibly the workpiece sensor.

It is another object of the invention to provide a machining system comprising:
a machining apparatus, notably a cutting machine, said machining apparatus being adapted for machining a workpiece; a monitoring device adapted for monitoring machining conditions of the machining apparatus and/or the workpiece,
the monitoring device comprising an array of microphones, said array comprising at least four microphones which comprise a first microphone at a first location, and a second microphone at a second location which is distant from the first location.

It is another object of the invention to provide a machining system comprising:
a machining apparatus, notably a cutting machine, said machining apparatus being adapted for machining a workpiece; a monitoring device adapted for monitoring machining conditions of the machining apparatus and/or the workpiece,
the monitoring device comprising an array of microphones, said array comprising at least ten microphones arranged on a planar support at distance and/or facing and/or configured for facing the machining apparatus and/or the workpiece, wherein said at least ten microphones comprise a first microphone is at a first location, and a second microphone is at a second location which is distant from the first location.

It is another object of the invention to provide a nozzle, said nozzle including: a cylindrical body, a passage across the cylindrical body for guiding an abrasive waterjet, a longitudinal direction along the passage, notably a vertical direction, two longitudinally opposite end sections, a vibration sensor at each end section.

Preferably, the vibration sensors may be accelerometers, preferably three-dimensional accelerometers.

Preferably, the cylindrical body may include a cylindrical outer surface on which the vibrations sensors are fixed.

It is another object of the invention to provide a monitoring process of an abrasive waterjet cutting system, the abrasive waterjet cutting system comprising: an abrasive waterjet cutting head with a nozzle guiding an abrasive waterjet, said nozzle including an inlet end and an outlet end; an abrasive waterjet flow direction, a monitoring device including an upstream sensor and a downstream sensor which are adapted for measuring a wear characteristic of the nozzle, or a characteristic of the abrasive waterjet, or an alignment characteristic of the nozzle with an orifice, or acoustic emission from the workpiece; the monitoring process including the following steps: (b) defining a benchmark of the abrasive waterjet cutting head by means of at least one of the upstream sensor and the downstream sensor; (d) measuring an upstream data and a downstream data with the upstream sensor and the downstream sensor respectively; (e) processing the upstream data and the downstream data in order to define a signature of the abrasive waterjet cutting head; (f) comparing the signature to the benchmark; the abrasive waterjet cutting system being notably in accordance with the invention.

Preferably, before step (b) defining a benchmark, the monitoring process may include a step (a) maintenance of the abrasive waterjet cutting head.

Preferably, the monitoring process may include a step (c) cutting a workpiece with the abrasive waterjet, the step (d) measuring may be performed during step (c) cutting.

Preferably, if the signature exceeds a tolerance with respect to the benchmark; the monitoring process may perform a step (g) producing at least one output signal which may be notably used for controlling the abrasive waterjet cutting head, or notably used for deciding a maintenance intervention.

Preferably, step (d) measuring may comprise measuring a pressure upstream the orifice, step (e) processing may comprise computing the static pressure and the dynamic pressure, notably through Fourier Transform or Wavelet Transform, step (f) comparing may comprise the comparison of said Fourier Transform or Wavelet Transform to a first benchmark.

Preferably, the upstream sensor may comprise an upstream microphone and the downstream sensor may comprise a downstream microphone; during step (e) processing, a net signal may be calculated with the upstream data and the downstream data, said net signal may be notably calculated by a decorrelation technique.

Preferably, the abrasive waterjet cutting system may include a workpiece sensor, notably a piezo electric sensor, which may be fixed to the workpiece, during step (e) processing, the net signal may be calculated with the upstream data, the downstream data, and the data from the workpiece sensor, said net signal may notably be calculated by a decorrelation technique.

Preferably, step (e) processing may comprise computation of Fourier Transform or Wavelet Transform of the net signal, said Fourier Transform or Wavelet Transform may be compared to a second benchmark during step (f) comparing.

Preferably, the upstream sensor may comprise an upstream accelerometer arranged at the inlet end of the nozzle or upstream the nozzle and providing an inlet signal, step (e) processing may comprise the estimation of the Fourier Transform or the Wavelet Transform of the inlet signal, said Fourier Transform or the Wavelet Transform may be compared to a third benchmark during step (f) comparing.

Preferably, the upstream sensor may comprise an upstream accelerometer, and the downstream sensor may comprise a downstream accelerometer, step (e) processing may comprise the calculation of a vibration transmissibility between the inlet end and the outlet end of the nozzle, said vibration transmissibility may be compared to a fourth benchmark during step (f) comparing.

Preferably, the plurality of sensors comprises N array microphones providing N array signals, step computing and step defining comprise the computation of a N×N cross-spectral matrix from the N array signals, said cross-spectral matrix may be used for localizing, isolating and characterizing acoustic sources by means of acoustic beamforming methods.

Preferably, the monitoring process may control iteratively several conformity requirements with respective benchmarks.

Preferably, the abrasive waterjet cutting system may include a workpiece reception area in which the workpiece is fixed downstream the downstream sensor.

Preferably, during step (b) defining the benchmark may be computed using same processing as used for defining the signature during step (e) processing.

Preferably, the benchmark may be computed for different operating setpoints of the abrasive waterjet cutting head, step (b) defining comprising a training period.

Preferably, at step (f) comparing the signature may be compared against a benchmark corresponding to an instantaneous setpoint of step (c) cutting.

Preferably, during step (e) processing the downstream data may be divided by the upstream data.

Preferably, during step (e) processing the downstream data may be subtracted from the upstream data.

Preferably, during step (e) processing the upstream data and the downstream data may be measured at a same radial distance from the cutting abrasive waterjet. A radial distance may be measured perpendicularly to the waterjet.

Preferably, during step (f) comparing, the signature may be compared to a theorical benchmark.

Preferably, during step (c) cutting, the gap between the workpiece and the nozzle may remain constant.

Preferably, the or each Fourier transform, or the or each Wavelet Transform may be estimated using an Auto-Regressive-Moving-Average estimation of a raw signal.

Preferably, during step (d) measuring, the distance D2 may remain constant.

Preferably, during step (d) measuring may be continuous.

Preferably, step (e) processing may bean iterative processing, repeated at a regular time interval, said regular interval may range from 15 seconds to 25 seconds, on signals which may be windowed on that interval.

Preferably, in each set of sensors the downstream sensor may be nearer to the workpiece than the upstream sensor, and/or the upstream sensor may be nearer to the inlet end than the downstream sensor.

Preferably, step (f) comparing may compare the transmissibility to the fourth benchmark if the Fourier Transform or the Wavelet Transform of the upstream signal is consistent with the third benchmark; and/or the Fourier Transform or the Wavelet Transform of the upstream signal may be compare to the third benchmark third benchmark if the Fourier Transform or the Wavelet Transform of the net signal is consistent with the second benchmark; and/or the Fourier Transform or the Wavelet Transform of the net signal may be compared to the second benchmark if the upstream pressure is consistent with the first benchmark.

Preferably, step (b) defining a benchmark may be performed before step (c) cutting, and/or without workpiece.

Preferably, during step (a) maintenance, a new nozzle or a new orifice may be mounted in the abrasive waterjet cutting head, or the nozzle and the orifice may be realigned.

Preferably, the signature may be a vibroacoustic signature.

Preferably, the abrasive waterjet cutting system may comprise a nozzle area wherein the upstream sensor and the downstream sensor may be enclosed, the abrasive waterjet cutting system may further comprise a cutting area between the workpiece and the nozzle area, step (d) measuring may comprise measuring data with a second upstream sensor and a second downstream sensor within the cutting area.

Preferably, the upstream sensor and the downstream sensor may be distributed along the abrasive waterjet flow direction downstream the inlet end of the nozzle, and/or between the workpiece and the inlet end of the nozzle.

Preferably, during step (d) measuring and/or during step (b) defining, the abrasive waterjet may flow.

Preferably, at step (b) defining, the benchmark may be defined by the upstream sensor and the downstream sensor.

Preferably, step (b) defining and step (e) processing may comprise the same calculation steps.

Preferably, the signals may be synchronized.

It is another object of the invention to provide a monitoring process of an abrasive waterjet cutting system, the abrasive waterjet cutting system comprising:
- an abrasive waterjet cutting head with an orifice, a nozzle guiding an abrasive waterjet, said nozzle including an inlet end and an outlet end;
- an abrasive waterjet flow direction,
- a monitoring device notably adapted for measuring a wear characteristic of the nozzle, and/or a characteristic of the abrasive waterjet, and/or an alignment characteristic of the nozzle with an orifice;
- the monitoring process including the following steps:
- (c) cutting a workpiece with the abrasive waterjet;
- (d) measuring an upstream data at an upstream location and a downstream data at a downstream location, said location being between the workpiece and the inlet end of the nozzle;
- (f) comparing the upstream data and the downstream data, eventually to each other, the abrasive waterjet cutting system being notably in accordance with the invention.

Step (b) defining is not an essential aspect of the invention.

Step (e) processing is not an essential aspect of the invention.

It is another object of the invention to provide a monitoring process of an abrasive waterjet cutting system, the abrasive waterjet cutting system comprising:
- an abrasive waterjet cutting head with an orifice, a nozzle guiding an abrasive waterjet;
- an array of microphones facing the abrasive waterjet cutting system, notably at a distance of at most 1.00 m; said array is including an external frame, optionally with different planar geometry such as circular or rectangular, wherein said frame supports and internal planar array grid adapted for the positioning and the orientation in space of the grid; wherein said grid comprises N array positions in the plane of the array grid, and wherein N microphones are placed; said N array positions optionally exhibiting different patterns, possibly regular, random or spiral; wherein said array of microphones provide a set of N array signals.

Preferably, the monitoring process may include the following steps:
- (c) cutting a workpiece with the abrasive waterjet;
- (d) measuring N array signals;

Step (b) defining is not an essential aspect of the invention.

Step (e) processing is not an essential aspect of the invention.

It is another object of the invention to provide a computer comprising computer readable code means, which when run on a computer, cause the computer to run the monitoring process according to the invention.

It is another object of the invention to provide a computer program product including a computer readable medium on which the computer program according to the invention is stored.

It is another object of the invention to provide a computer configured for carrying out the monitoring process according to the invention.

The different objects of the invention may be combined to each other. The preferable options of each object may be applied to the other objects of the invention, unless the contrary is explicitly mentioned.

Advantages of the Invention

The invention distributes the plurality of sensors at key locations in the machining system. The sensors are arranged close to the guide for cutting means, for instance the nozzle, and at remote locations from said cutting means. The sensors may be arranged on units triggering a machining effort, or in the environment of the machining system. The invention also allows monitoring of a sharp cutting tool, and to follow up the corresponding wear state.

In addition, the monitoring method uses the plurality of signals from the plurality of sensors, and then provides a clean signal corresponding to the working conditions of the cutting means, or of the corresponding guide if required. In order to improve automation, the invention uses a library of benchmarks which are defined at installation, or at least during ideal conditions. Algorithms provide the most relevant benchmark contained in the library such that the real time conditions are compared against the most suitable reference.

A general understanding of the invention could be to measure one or several characteristic(s) of the system and/or the workpiece under conform conditions by one or two distant sensors, and then to monitor the characteristic(s) during cutting by the two sensors. With respect to the two microphones; one of the two microphones is used to clean the data of the other microphone in order to separate the contributions of the system from the contributions of the workpiece.

The invention provides an AWC system functioning with a couple of sensors which are arranged at different locations along the waterjet. At their distant locations, the sensors permit a differential measurement, and provide different signals which are compared to each other, and/or compared to a given precise benchmark. The provided monitoring improves the monitoring accuracy, and consequently the quality of the produced workpieces. Thus, a substantial economy and automation may be obtained. Moreover, the accurate monitoring optimises the time during which a nozzle may still be used. Thus, the invention increases the lifetime of nozzle. The high accuracy, and the multiple signals obtained allows an exploitation during design studies of nozzle or other components, for better understanding of wear phenomena.

The pair of microphones, optionally in combination with the piezoelectric sensor, permits to isolate acoustic contribution of the waterjet from the acoustic contribution of environment, particularly the workpiece. Consequently, the invention provides separated information of the cutting waterjet escaping the nozzle and of the workpiece, and allows a detection of the separate features.

The pair of accelerometers offers signals proper to the nozzle. The accelerometers may essentially be in contact of the nozzle in order to reduce the influence of its supports, or the frame of the AWC system. Consequently, the obtained vibration transmissibility becomes more relevant and the wear state may be assessed more precisely.

The invention is of first interest since it provides monitoring data during the cutting operation. Thus, the monitoring task does not stop the production and does not impact the manufacturing costs. In addition, the invention provides a better understanding of the AWC system state, and reduces the computing resources which are required for attaining a given level of knowledge and accuracy.

The invention exploits an integrated network of accelerometers for computing a matrix of vibration transmissibilities. Said matrix provides robust indicators which are sensitive to the wear progression of components and less affected by other factors besides those of interest with respect to the usage of accelerometers as standalone.

The invention exploits an array of microphones and beamforming methods for localizing, isolating and characterizing acoustic sources of the machining apparatus and the workpiece.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes the invention in further details based on preferred embodiments and on the figures. Identical reference numbers will be used to describe similar or the same concepts throughout different embodiments of the invention.

It should be noted that features described for a specific embodiment described herein may be combined with the features of other embodiments unless the contrary is explicitly mentioned. Features commonly known in the art will not be explicitly mentioned for the sake of focusing on the features that are specific to the invention. For example, the abrasive waterjet cutting system in accordance with the invention is evidently powered by an electric supply and pump system, even though such supply is not explicitly referenced on the figures nor referenced in the description. In the following description, the words "downstream" and "upstream" are considered in relation with the abrasive waterjet flow direction. These words also apply before the abrasive waterjet flow starts, and after the workpiece.

Figure 1:
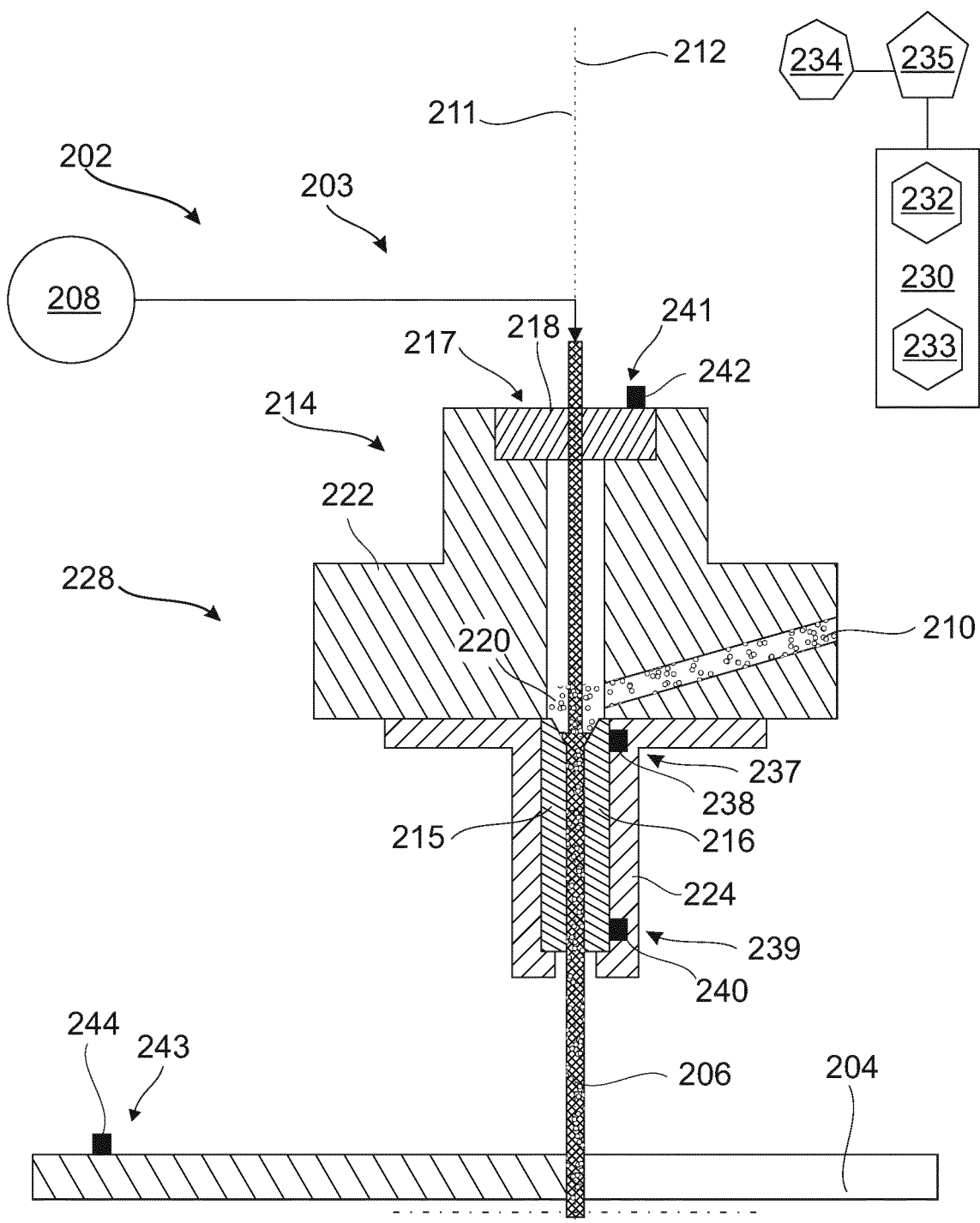
FIG. 1 provides a schematic illustration of a cut through a machining system in accordance with a first preferred embodiment of the invention.

FIG. 1 shows a cross section of a machining system 201 with a machining apparatus 202 in accordance with a first embodiment of the invention. The machining apparatus 202 may comprise an abrasive waterjet cutting system 203.

The abrasive waterjet cutting system 203 is represented above a workpiece 204 which is currently cut by the abrasive cutting waterjet 206 which may form cutting means. Cutting means are means adapted for removing material of the workpiece 204, and/or for severing portions therefrom. The current cross section is taken along the cut-out of the workpiece 204 which is represented with hatchings before the kerf, and which is hatching free within the kerf created by the abrasive cutting waterjet 206. Despite the workpiece 204 is represented under the abrasive waterjet cutting system 203, it is encompassed in the current invention any other orientation. For instance, the workpiece 204 may be beside the abrasive waterjet cutting system 203, and the abrasive cutting waterjet 206 may flow horizontally.

The abrasive waterjet cutting system 203 may include a high-pressure fluid source, notably a high-pressure water source or high-pressure water vessel. The high-pressure fluid source may comprise a pump 208. The cutting abrasive waterjet 206 is arbitrarily interrupted downstream the workpiece 204 for representation purpose, and may flow further downstream, notably in a through cut configuration. The pump 208 may be adapted for providing the fluid at a pressure ranging from 2500 bars to 6900 bars. For instance, the fluid pressure is about 4000 bars. The abrasive waterjet cutting system 203 may also comprise an abrasive particle supply 210.

The abrasive waterjet cutting system 203 may comprise a first axis 211. The first axis may correspond to an abrasive waterjet flow direction 212. The abrasive waterjet cutting system 203 may comprise an abrasive waterjet cutting head 214 with a nozzle 216 adapted for guiding the abrasive waterjet 206 along the abrasive waterjet flow direction 212 and transferring momentum from fluid to particles. The nozzle 216 is also known as a "focussing tube". The nozzle 216 may generally be considered as a first vibrating component 215. The nozzle 216, respectively the first vibrating component 215 may form a guide of the machining apparatus 202. The guide is adapted for guiding cuttings means, notably the abrasive cutting waterjet 206.

The abrasive waterjet flow direction 212 may be directed from the abrasive waterjet cutting head 214 toward the workpiece 204. The abrasive waterjet flow direction 212 may extend beyond the workpiece 204 and the abrasive waterjet cutting system 203. It may be colinear with the abrasive cutting waterjet 206.

The machining apparatus 202 may comprise a second vibrating component 217. The second vibrating component 217 may be an orifice 218. The orifice 218 may be in fluid communication with the pump 208.

The machining apparatus 202 may comprise a third vibrating component 224. The third vibrating component 224 may be a clamp used for tightening the nozzle 216.

The first vibrating component 215 may be certain distances from the second vibrating component 217 and the third vibrating component 224, notably along the first axis 211. The first and second vibrating component (215; 217) may be contact free. They may be at distance from the workpiece 204.

The orifice 218 may guide a high-speed waterjet toward the nozzle 216. Upstream the orifice 218, water may have a high-pressure, and downstream the orifice 218 water may have a high-speed. In the current context the above water may be understood as substantially "pure" water. The high-speed water jet may be a single-phase water jet. The high-speed water jet may accelerate the abrasive particles received in a mixing chamber 220. More precisely, the acceleration of particles is provided by momentum transfer with the high-speed water jet, and the momentum transfer may essentially take place in the nozzle 216. The abrasive waterjet cutting system 203 may be adapted such that the abrasive cutting waterjet 206 reaches a speed in the range of 300-1200 m/s downstream the nozzle 216. The abrasive cutting waterjet 206 may be a three phases waterjet, and may include water, air and abrasive particles in suspension.

In order to monitor the functioning of the machining apparatus 202, the machining system may comprise a monitoring device 228. The latter is adapted for monitoring machining conditions of the machining apparatus and/or machining conditions of the workpiece 204.

The monitoring device 228 may be connected to a computer 230 in order to process signals. More precisely, the computer 230 may include a computer readable medium 232 on which a computer program is stored, and a central processing unit (CPU) 233 which is adapted for carrying out the instructions of the computer program. The monitoring device 228 may include a preamplifier 234 connected to the computer 230, and amplifying electric signals from sensors, notably the sensors as set forth below. An acquisition board 235 with an A/D converter may connect the preamplifier 234 or directly the sensors to the computer 230.

The monitoring device 228 comprises a plurality of sensors. For instance, the plurality or sensors comprises at least a first sensor 237 and a second sensor 239. The first sensor 237 and the second sensor 239 may be separate and distinct. They may be at distance from one another and may be at a first location and at a second location respectively, the latter may be at distance from the first location. They may provide a first signal and a second signal respectively.

The first sensor 237 may be in contact of the first vibrating component 215. As an option, the second sensor 239 may be in contact of the first vibrating component 215. As an option, the second sensor 239 may be in contact with the third vibrating component 224, namely the clamp for tightening the nozzle 216. The first sensor 237 and a second sensor 239 may be distributed along the first vibrating component 215 and may notably be arranged at opposite ends with regard to the direction 212. The second sensor 239 may be downstream the first sensor 237.

Optionally, the plurality of sensors may comprise a third sensor 241 and possibly a fourth sensor 243. The third sensor 241 and the fourth sensor 243 may provide a third signal and a fourth signal respectively. The first and second sensors (237; 239) may be arranged between the third and fourth sensors (241; 243).

The first to fourth sensors (237; 239; 241; 243) may be separate and distinct. They may be at distance from one another. They may be distributed along the first axis 211.

The third sensor 241 may be in contact of the second vibrating component 217; namely the orifice 218. Accordingly, the third sensor 241 may be designated as an orifice sensor 241. The third sensor 241 may be upstream the first sensor 237. As an option, the third sensor may be in contact with the third vibrating component, namely the clamp for tightening the nozzle 224. As an option, the third sensor may be in contact with the first vibrating component 215, namely the nozzle 216.

The fourth sensor 243 may be in contact of the workpiece 204; it may therefore be designated as a workpiece sensor 243. The fourth sensor 243 may be arranged downstream the first sensors 237; and notably downstream the second sensor 239.

The plurality of sensors may comprise at least one accelerometer sensor. As an option, each sensors of the plurality of sensors comprise an accelerometer sensor. The first sensor 239 may comprise a first accelerometer sensor 238. The second sensor 239 may comprise a second accelerometer sensor 240. The third sensor 241 may comprise a third accelerometer sensor 242. The fourth sensor 243 may comprise a fourth accelerometer sensor 244, also designated as workpiece accelerometer sensor 244. The accelerometers sensors (238; 240; 242; 244) may comprise microelectromechanical systems sensors, which are generally designated by the acronym "MEMS". The first accelerometer sensor 238 may be in contact of the nozzle 216. Optionally, the second accelerometer sensor 240 is also in contact of the nozzle 216. Optionally, the second accelerometer sensor 240 is in contact with the clamp 224 for tightening the nozzle 216. The third accelerometer sensor 242 may be in contact of the orifice 218. Optionally, the third accelerometer sensor 242 may be in contact with the nozzle 216. Optionally, third accelerometer sensor 242 may be in contact with the clamp 224 for tightening the nozzle 216. The fourth accelerometer sensor 244 may be in contact of the workpiece 204.

As an alternative or in addition, the plurality of sensors may comprise at least one strain gauge sensor. Optionally, each sensor of the plurality of sensors comprise a strain gauge sensor. The first sensor 237 may comprise a first strain gauge sensor. The second sensor 239 may comprise a second strain gauge sensor. The third sensor 241 may comprise a third strain gauge sensor. The fourth sensor 243 may comprise a fourth strain gauge sensor 244, also designated as workpiece strain gauge sensor 244.

In an embodiment of the invention, at least one or each sensor of the plurality of sensors comprise an accelerometer sensor and a strain gauge sensor. It may be considered that at least one or each sensor of the plurality of sensor is a sensor module combining several sensor elements, the sensor elements possibly being of different kind. The sensors elements may be distinct and notably at distance from one another.

As an alternative of the invention, the machining apparatus 202 may be a milling machine. In the milling machine, the cutting means may comprise a milling cutter. At least one of the first sensor and the second sensor may be in contact of the milling cutter. The first axis 211 may correspond to the rotation axis of the milling cutter. The milling cutter may comprise at least one cutting edge, or a plurality of cutting edge distributed around the first axis. The cutting edge may be a sharp edge. The second to fourth accelerometer sensors are purely optional in view of the invention. The fact that the plurality of sensors comprises more than one accelerometer sensor remains an option. In an embodiment, the plurality of sensors comprises the so called first accelerometer sensor and the so called third accelerometer sensor; notably without the so called second accelerometer sensor and/or the so called fourth accelerometer sensor. Other combinations are considered.

In the current embodiment, three vibrating components are defined. However other vibrating components may be identified in the machining apparatus 202. For instance, a transmission with gearings, and a hood, may be considered as vibrating components of the machining apparatus. Similarly, only four accelerometer sensors or only four strain gauge sensors are defined in the current description. However, the invention considers providing five or more accelerometer sensors, and/or five or more strain gauge sensors. These further sensors may be arranged at different locations.

Figure 2:
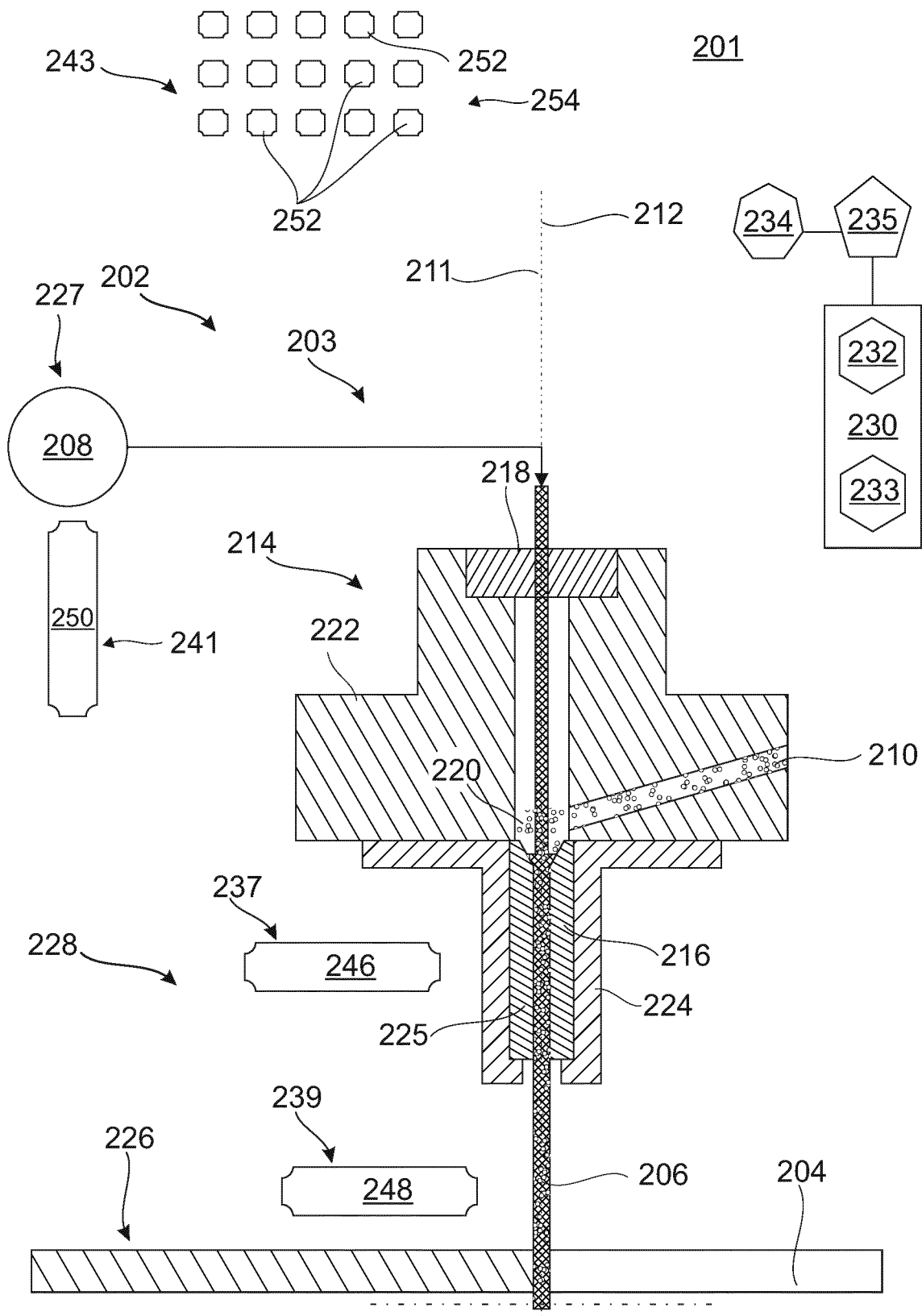
FIG. 2 provides a schematic illustration of a cut through a machining system in accordance with a first preferred embodiment of the invention.

FIG. 2 shows a cross section of a machining system 201 with a machining apparatus 202 in accordance with a second embodiment of the invention. The machining apparatus 202 may comprise an abrasive waterjet cutting system 203. The second embodiment of the invention is substantially similar to the first embodiment.

The abrasive waterjet cutting system 203 is represented above a workpiece 204 which is currently cut by the abrasive cutting waterjet 206 which may form cutting means. Cutting means are means adapted for removing material of the workpiece 204, and/or for severing portions therefrom. The current cross section is taken along the cut-out of the workpiece 204 which is represented with hatchings before the kerf, and which is hatching free within the kerf created by the abrasive cutting waterjet 206. Despite the workpiece 204 is represented under the abrasive waterjet cutting system 203, it is encompassed in the current invention any other orientation. For instance, the workpiece 204 may be beside the abrasive waterjet cutting system 203, and the abrasive cutting waterjet 206 may flow horizontally.

The abrasive waterjet cutting system 203 may include a high-pressure fluid source, notably a high-pressure water source or high-pressure water vessel. The high-pressure fluid source may comprise a pump 208. The cutting abrasive waterjet 206 is arbitrarily interrupted downstream the workpiece 204 for representation purpose, and may flow further downstream, notably in a through cut configuration. The pump 208 may be adapted for providing the fluid at a pressure ranging from 2500 bars to 6900 bars. For instance, the fluid pressure is about 4000 bars. The abrasive waterjet cutting system 203 may also comprise an abrasive particle supply 210.

The abrasive waterjet cutting system 203 may comprise a first axis 211. The first axis may correspond to an abrasive waterjet flow direction 212. The abrasive waterjet cutting system 203 may comprise an abrasive waterjet cutting head 214 with a nozzle 216 adapted for guiding the abrasive waterjet 206 along the abrasive waterjet flow direction 212 and transferring momentum from fluid to particles.

The nozzle 216 is also known as a "focussing tube". The nozzle 216 may form a guide of the machining apparatus 202. The guide is adapted for guiding cuttings means, notably the abrasive cutting waterjet 206.

The waterjet 206 may generally be considered; by convention; as a first sound source since 225 during operation the machining apparatus 202 emits sounds.

During operation, the workpiece 204 emits sounds. By convention, the workpiece 204 and in particular the imping-ing point of the waterjet 206 may be considered as a second sound source 226. The pump 208 may also emit sounds. Therefore, it may—by convention—be considered as a third sound source 227.

The abrasive waterjet flow direction 212 may be directed from the abrasive waterjet cutting head 214 toward the workpiece 204. The abrasive waterjet flow direction 212 may extend beyond the workpiece 204 and the abrasive waterjet cutting system 203. It may be colinear with the abrasive cutting waterjet 206.

The machining apparatus 202 may comprise an orifice 218. The orifice 218 may be in fluid communication with the pump 208. The orifice 218 may be at distance from the first sound source 225, notably along the first axis 211. The orifice 218 and the first sound source 225 may be contact free. They may be at distance from the workpiece 204. Thus, the first sound source 225 and the second sound source may be at distance from one another. Alternatively, there may not be appreciable separation between the first and the second sound source. In such case, the first and second sound sources may be referred as the first sound source all together.

The orifice 218 may guide a high-speed waterjet toward the nozzle 216. Upstream the orifice 218, water may have a high-pressure, and downstream the orifice 218 it may have a high-speed. The high-speed water jet may be a single-phase water jet. The high-speed water jet may accelerate the abrasive particles received in a mixing chamber 220. More precisely, the acceleration of particles is provided by momentum transfer with the high-speed water jet, and the momentum transfer may essentially take place in the nozzle 216. The abrasive waterjet cutting system 203 may be adapted such that the abrasive cutting waterjet 206 reaches a speed in the range of 300-1200 m/s downstream the nozzle 216. The abrasive cutting waterjet 206 may be a three phases waterjet, and may include water, air and particles in suspension.

In order to monitor the functioning of the machining apparatus 202, the machining system may be equipped with a monitoring device 228. The latter is adapted for monitoring machining conditions of the machining apparatus and/or machining conditions of the workpiece 204.

The monitoring device 228 may be connected to a computer 230 in order to process signals. More precisely, the computer 230 may include a computer readable medium 232 on which a computer program is stored, and a central processing unit (CPU) 233 which is adapted for carrying out the instructions of the computer program. The monitoring device 228 may include a preamplifier 234 connected to the computer 230, and amplifying electric signals from sensors, notably the sensors as set forth below. An acquisition board 235 with an A/D converter may connect the preamplifier 234 or directly the sensors to the computer 230.

The monitoring device 228 may comprise a plurality of sensors. For instance, the plurality or sensors comprises at least a first sensor 237 and a second sensor 239. The first sensor 237 and the second sensor 239 may be separate and distinct. They may be at distance from one another and may be at a first location and at a second location respectively, the latter may be at distance from the first location. They may provide a first signal and a second signal respectively.

Optionally, the plurality of sensors may comprise a third sensor 241 and possibly a fourth sensor 243. The third sensor 241 and the fourth sensor 243 may provide a third signal and a fourth signal respectively.

The plurality of sensors may comprise at least one microphone sensor. As an option, each sensors of the plurality of sensors comprise a microphone sensor. The first sensor 237 may comprise a first microphone sensor 248. The second sensor 239 may comprise a second microphone sensor 248. The third sensor 241 may comprise a third microphone sensor 250. The fourth sensor 243 may comprise at least one fourth microphone sensor 252, or set of fourth sensor possibly defining a grid 254. The fourth microphone sensor 252 may form an array of microphones.

The microphone sensors (248; 246; 250; 252) may comprise microelectromechanical systems sensors (MEMS sensors).

The first sensor 237 may be for the first sound source 225, notably in order to measure emission from the latter. The first sensor 237 may be associated with the first sound source 225. The first microphone sensor 246 may be adapted such that the first signal mainly corresponds to the sound from the first sound source. Along the first axis 211, the first microphone sensor 246 may be level with the first sound source 225. The first sound source 225 may be nearer to the first microphone sensor 246 than to the other microphone sensors of the plurality of sensors. The distance between the first sound source 225, respectively the support, and the first microphone sensor 246 is smaller than the distance between the first sound source 225 and any microphone sensor from the second to the fourth microphone sensor (248; 250; 252). The distance between the first sound source 225, respectively the support, and the first microphone sensor 246 is at least two or at least ten time smaller than the distance with the other microphone sensors of the plurality.

In an option, the second sound source is spatially separated from the first. In such case, the second sensor 239 may be for the second sound source 226. The second sensor 239 may be associated with the second sound source 226. The second microphone sensor 248 may be adapted such that the second signal mainly corresponds to the sound from the second sound source 226. Along the first axis 211, the second microphone sensor 248 may be disposed between the first microphone sensor 246 and the second sound source 226. Amongst the microphone sensors of the plurality of sensors, the second sound source 226 may be closer to the second microphone sensor 248. The third sensor 241 may be dedicated to the third sound source 227. They may be in the vicinity from each other. The third microphone sensor 250 may be adapted for sensing sound emitted by the pump 208. The third sound source 227 may nearer to the third microphone sensor 250 than to the first, second and fourth microphone (246; 248; 252).

In another option, the second sound source is not spatially separated from the first. In such case, second sensor 239 may be dedicated to the third sound source 227. They may be in the vicinity from each other. The second microphone sensor 248 may be adapted for sensing sound emitted by the pump 208. The third sound source 227 may nearer to the second microphone sensor 248 than to the first, third and fourth microphone (246; 248; 252).

The fourth microphone sensors 252 may define an array of microphones 252. The positions of the microphones on array of the microphones 252 on the grid may form a certain pattern, possibly a regular, random, spiral. The fourth microphone sensors 252 may be arranged in a planar grid 254, and may form a group or array. The array of microphones 254 may provide a beamforming antenna. The of microphones 252 may be above the machining apparatus 202. For instance, the array of microphones 252 is 1 m away from the machining apparatus 202. The array of microphones 252 may be aside the machining apparatus 202. For instance, the array of microphones is 1 m aside from the machining apparatus 202. Consequently, the fourth microphone sensors 252 may adapted for sensing the sound emitted within the environment of the considered machining apparatus 202. The environment may notably comprise other machining apparatus 202 which are of the same kind, or of different kinds, than the considered machining apparatus 202. The second to fourth microphone sensors are purely optional in view of the invention. The fact that the plurality of sensors comprise more than one microphone sensor remains an option.

In an embodiment, the plurality of sensors comprises the so called fourth microphone sensor, notably without the so called first microphone sensor and/or the so called second microphone sensor and/or the so called third microphone sensor. All the microphones are supported by a grid support.

In an embodiment, the plurality of sensors comprises the so called first microphone sensor and the so called fourth microphone sensor; notably without the so called third microphone sensor and/or the so called second microphone sensor. Other combinations are considered.

In the current embodiment, three sound sources are considered. However, the invention considers identifying further sound sources, and possibly providing these further sources with further microphone sensors.

As an alternative of the invention, the array of microphones 252 is used instead of the first to third microphones (246, 250). They may functionally replace them. Then the grid 254 of microphones ensures the data acquisition for monitoring. The fourth microphones 252 replaces the sensors of the monitoring device 228.

Figure 3:
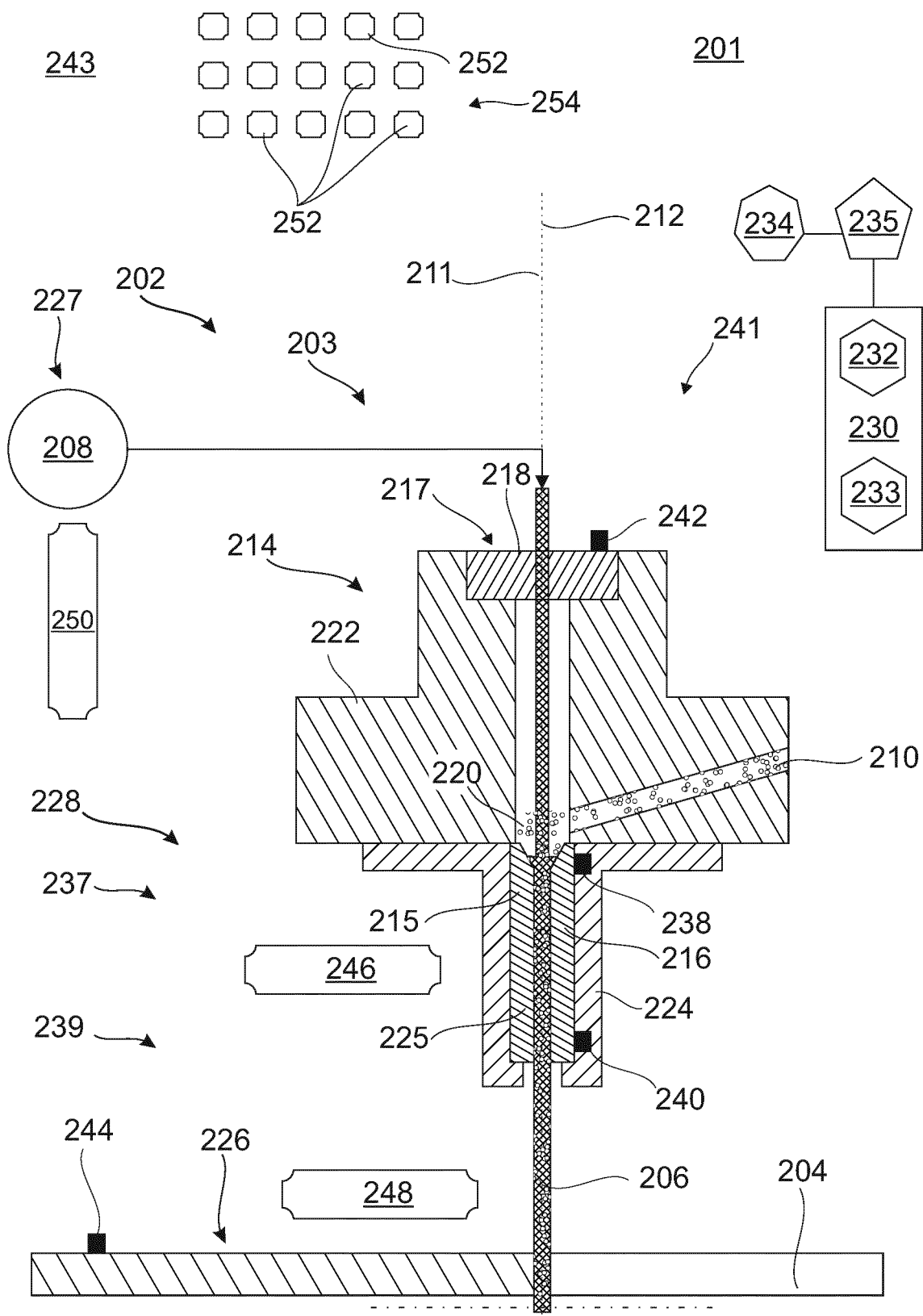
FIG. 3 provides a schematic illustration of a cut through a machining system in accordance with a first preferred embodiment of the invention.

FIG. 3 shows a cross section of a machining system 201 with a machining apparatus 202 in accordance with a third embodiment of the invention. The machining apparatus 202 may be an abrasive waterjet cutting system 203. The third embodiment of the invention substantially combines the first embodiment with the second embodiment as previously described.

The abrasive waterjet cutting system 203 is represented above a workpiece 204 which is currently cut by the abrasive cutting waterjet 206 which may form cutting means. Cutting means are means adapted for removing material of the workpiece 204, and/or for severing portions therefrom. The current cross section is taken along the cut-out of the workpiece 204 which is represented with hatchings before the kerf, and which is hatching free within the kerf created by the abrasive cutting waterjet 206. Despite the workpiece 204 is represented under the abrasive waterjet cutting system 203, it is encompassed in the current invention any other orientation. For instance, the workpiece 204 may be beside the abrasive waterjet cutting system 203, and the abrasive cutting waterjet 206 may flow horizontally.

The abrasive waterjet cutting system 203 may include a high-pressure fluid source, notably a high-pressure water source or high-pressure water vessel. The high-pressure fluid source may comprise a pump 208. The cutting abrasive waterjet 206 is arbitrarily interrupted downstream the workpiece 204 for representation purpose, and may flow further downstream, notably in a through cut configuration. The pump 208 may be adapted for providing the fluid at a pressure ranging from 2500 bars to 6900 bars. For instance, the fluid pressure is about 4000 bars. The abrasive waterjet cutting system 203 may also comprise an abrasive particle supply 210.

The abrasive waterjet cutting system 203 may comprise a first axis 211. The first axis may correspond to an abrasive waterjet flow direction 212. The abrasive waterjet cutting system 203 may comprise an abrasive waterjet cutting head 214 with a nozzle 216 adapted for guiding the abrasive waterjet 206 along the abrasive waterjet flow direction 212 and transferring momentum from fluid to particles. The nozzle 216 is also known as a "focussing tube". The nozzle 216 may generally be considered as a first vibrating component 215. The nozzle 216 may generally be considered; by convention; as a first sound source 226 since during operation the machining apparatus 202 emits sounds. The nozzle 216, respectively the first vibrating component 215 may form a guide of the machining apparatus 202. The guide is adapted for guiding cuttings means, notably the abrasive cutting waterjet 206.

During operation, the workpiece 204 emits sounds. By convention, the workpiece 204 may be considered as a second sound source 226. The pump 208 may also emit sounds. Therefore, it may—by convention—be considered as a third sound source 227.

The abrasive waterjet flow direction 212 may be directed from the abrasive waterjet cutting head 214 toward the workpiece 204. The abrasive waterjet flow direction 212 may extend beyond the workpiece 204 and the abrasive waterjet cutting system 203. It may be colinear with the abrasive cutting waterjet 206.

The orifice 218 may be at distance from the first sound source 225, notably along the first axis 211. The orifice 218 and the first sound source 225 may be contact free. They may be at distance from the workpiece 204. Thus, the first sound source 225 and the second sound source may be at distance from one another.

The machining apparatus 202 may comprise a second vibrating component 217. The second vibrating component 217 may be an orifice 218. The orifice 218 may be in fluid communication with the pump 208. The first vibrating component 215 may be at distance from the second vibrating component 217, notably along the first axis 211. The first and second vibrating component (215; 217) may be contact free. They may be at distance from the workpiece 204.

The orifice 218 may guide a high-speed waterjet toward the nozzle 216. Upstream the orifice 218, water may have a high-pressure, and downstream the orifice 218 water may have a high-speed. In the current context the above water may be understood as substantially "pure" water. The high-speed water jet may be a single-phase water jet. The high-speed water jet may accelerate the abrasive particles received in a mixing chamber 220. More precisely, the acceleration of particles is provided by momentum transfer with the high-speed water jet, and the momentum transfer may essentially take place in the nozzle 216. The abrasive waterjet cutting system 203 may be adapted such that the abrasive cutting waterjet 206 reaches a speed in the range of 300-1200 m/s downstream the nozzle 216. The abrasive cutting waterjet 206 may be a three phases waterjet, and may include water, air and particles in suspension.

In order to assess the functioning of the machining apparatus 202, the machining system may comprise a monitoring device 228. The latter is adapted for monitoring machining conditions of the machining apparatus and/or machining conditions of the workpiece 204.

The monitoring device 228 may be connected to a computer 230 in order to process signals. More precisely, the computer 230 may include a computer readable medium 232 on which a computer program is stored, and a central processing unit (CPU) 233 which is adapted for carrying out the instructions of the computer program. The monitoring device 228 may include a preamplifier 234 connected to the computer 230, and amplifying electric signals from sensors, notably the sensors as set forth below. An acquisition board 235 with an A/D converter may connect the preamplifier 234 to the computer 230.

The monitoring device 228 comprises a plurality of sensors. For instance, the plurality or sensors comprises at least a first sensor 237 and a second sensor 239. The first sensor 237 and the second sensor 239 may be separate and distinct. They may be at distance from one another and may be at a first location and at a second location respectively, the latter may be at distance from the first location. They may provide a first accelerometer signal and a second accelerometer signal respectively.

The first sensor 241 may be in contact of the first vibrating component 215. As an option, the second sensor 239 may be in contact of the first vibrating component 215. The first sensor 237 and a second sensor 239 may be distributed along the first vibrating component 215, and may notably be arranged at opposite ends with regard to the direction 212. The second sensor 239 may be downstream the first sensor 237.

Optionally, the plurality of sensors may comprise a third sensor 241 and possibly a fourth sensor 243. The third sensor 241 and the fourth sensor 243 may provide a third accelerometer signal and a fourth accelerometer signal respectively. The first and second sensors (237; 239) may be arranged between the third and fourth sensors (241; 243).

The first to fourth sensors (237; 239; 241; 243) may be separate and distinct. They may be at distance from one another. They may be distributed along the first axis 211.

The third sensor 241 may be in contact of the second vibrating component 217; namely the orifice 218. Accordingly, the third sensor 241 may be designated as an orifice sensor 241. The third sensor 241 may be upstream the first sensor 237.

The fourth sensor 243 may be in contact of the workpiece 204; it may therefore be designated as a workpiece sensor 243. The fourth sensor 243 may be arranged downstream the first sensors 237; and notably downstream the second sensor 239.

The plurality of sensors may comprise at least one accelerometer sensor. As an option, each sensors of the plurality of sensors comprise an accelerometer sensor. The first sensor 237 may comprise a first accelerometer sensor 238. The second sensor 239 may comprise a second accelerometer sensor 240. The third sensor 241 may comprise a third accelerometer sensor 242. The fourth sensor 243 may comprise a fourth accelerometer sensor 244, also designated as workpiece accelerometer sensor 244. The accelerometers sensors (238; 240; 242; 244) may comprise microelectromechanical systems sensors, which are generally designated by the acronym "MEMS".

The first accelerometer sensor 238 may be in contact of the nozzle 216. Optionally, the second accelerometer sensor 240 is also in contact of the nozzle. The third accelerometer sensor 242 may be in contact of the orifice 218. The fourth accelerometer sensor 244 may be in contact of the workpiece 204.

As an alternative or in addition, the plurality of sensors may comprise at least one strain gauge sensor. Optionally, each sensor of the plurality of sensors comprise a strain gauge sensor. The first sensor 237 may comprise a first strain gauge sensor. The second sensor 239 may comprise a second strain gauge sensor. The third sensor 241 may comprise a third strain gauge sensor. The fourth sensor 243 may comprise a fourth strain gauge sensor 244, also designated as workpiece strain gauge sensor 244.

In an embodiment of the invention, at least one or each sensor of the plurality of sensors comprise an accelerometer sensor and a strain gauge sensor. It may be considered that at least one or each sensor of the plurality of sensor is a sensor module combining several sensor elements, the sensor elements possibly being of different kind. The sensors elements may be distinct and notably at distance from one another.

As an alternative of the invention, the machining apparatus 202 may be a milling machine. In the milling machine, the cutting means may comprise a milling cutter. At least one of the first sensor and the second sensor may be in contact of the milling cutter. The first axis 211 may correspond to the rotation axis of the milling cutter. The milling cutter may comprise at least one cutting edge, or a plurality of cutting edge distributed around the first axis. The cutting edge may be a sharp edge. The second to fourth accelerometer sensors are purely optional in view of the invention. The fact that the plurality of sensors comprises more than one accelerometer sensor remains an option. In an embodiment, the plurality of sensors comprises the so called first accelerometer sensor and the so called third accelerometer sensor; notably without the so called second accelerometer sensor and/or the so called fourth accelerometer sensor. Other combinations are considered.

In the current embodiment, two vibrating components are defined. However other vibrating components may be identified in the machining apparatus 202. For instance, a transmission with gearings, and a hood, may be considered as vibrating components of the machining apparatus. Similarly, only four accelerometer sensors or only four strain gauge sensors are defined in the current description. However, the invention considers providing five or more accelerometer sensors, and/or five or more strain gauge sensors. These further sensors may be arranged at different locations.

The plurality of sensors may comprise at least one microphone sensor. As an option, each sensors of the plurality of sensors comprise a microphone sensor. The first sensor 237 may comprise a first microphone sensor 246. The second sensor 239 may comprise a second microphone sensor 248. The third sensor 241 may comprise a third microphone sensor 250. The fourth sensor 243 may comprise at least one fourth microphone sensor 252, or set of fourth sensor possibly defining an array, or group of fourth sensor. The sensors of the array may be disposed in a grid arrangement, or on grid support 254. The microphone sensors (238; 240; 242; 244) may comprise microelectromechanical systems sensors (MEMS sensors).

The first sensor 237 may be for the first sound source 225, notably in order to measure emission from the latter. The first sensor 237 may be associated with the first sound source 225. The first microphone sensor 246 may be adapted such that the first signal mainly corresponds to the sound from the first sound source. Along the first axis 211, the first microphone sensor 246 may be level with the first sound source 225. The first sound source 225 may be nearer to the first microphone sensor 246 than to the other microphone sensors of the plurality of sensors. The distance between the first sound source 225, respectively the support, and the first microphone sensor 246 is smaller than the distance between the first sound source 225 and any microphone sensor from the second to the fourth microphone sensor (248; 250; 252). The distance between the first sound source 225, respectively the support, and the first microphone sensor 246 is at least two or at least ten time smaller than the distance with the other microphone sensors of the plurality.

The second sensor 239 may be for the second sound source 226. The second sensor 239 may be associated with the second sound source 226. The second microphone sensor 248 may be adapted such that the second signal mainly corresponds to the sound from the second sound source 226. Along the first axis 211, the second microphone sensor 248 may be disposed between the first microphone sensor 246 and the second sound source 226. Amongst the microphone sensors of the plurality of sensors, the second sound source 226 may be closer to the second microphone sensor 248.

The third sensor 241 may be dedicated to the third sound source 227. They may be in the vicinity from each other. The third microphone sensor 250 may be adapted for sensing sound emitted by the pump 208. The third sound source 227 may nearer to the third microphone sensor 250 than to the first, second and fourth microphone (246; 248; 250).

The fourth microphone sensors 252 may define a grid 254. The grid 254 may form a matrix, possibly with a regular pattern. The fourth microphone sensors 252 may be arranged in a plan. The fourth microphone sensors 252 may form an antenna. The fourth microphone sensors 252 may be close to the machining apparatus 202. They may be above or beside. For instance, the fourth microphone sensors 252 are, at least, 1 m, and/or at most 2 m, away from the machining apparatus 202. Consequently, the fourth microphone sensors 252 may adapted for mainly sensing the sound emitted by the environment of the considered machining apparatus 202. The environment may notably comprise other machining apparatus 202 which are of the same kind, or of different kinds, than the considered machining apparatus 202.

The second to fourth microphone sensors are purely optional in view of the invention. The fact that the plurality of sensors comprise more than one microphone sensor remains an option.

In an embodiment, the plurality of sensors comprises the so called first microphone sensor and the so called fourth microphone sensor; notably without the so called third microphone sensor and/or the so called second microphone sensor. Other combinations are considered.

In the current embodiment, three sound sources are considered. However, the invention considers identifying further sound sources, and possibly providing these further sources with further microphone sensors.

As an alternative of the invention, the array of microphones 252 replaces the first to third microphones (246, 250). In addition, or as an alternative, the fourth microphones 252 are used instead of at least one or each of the first to fourth accelerometers (238-244). Then the grid 254 of microphones ensures the data acquisition for monitoring. The fourth microphones 252 replaces the sensors of the monitoring device 228.

Figure 4:
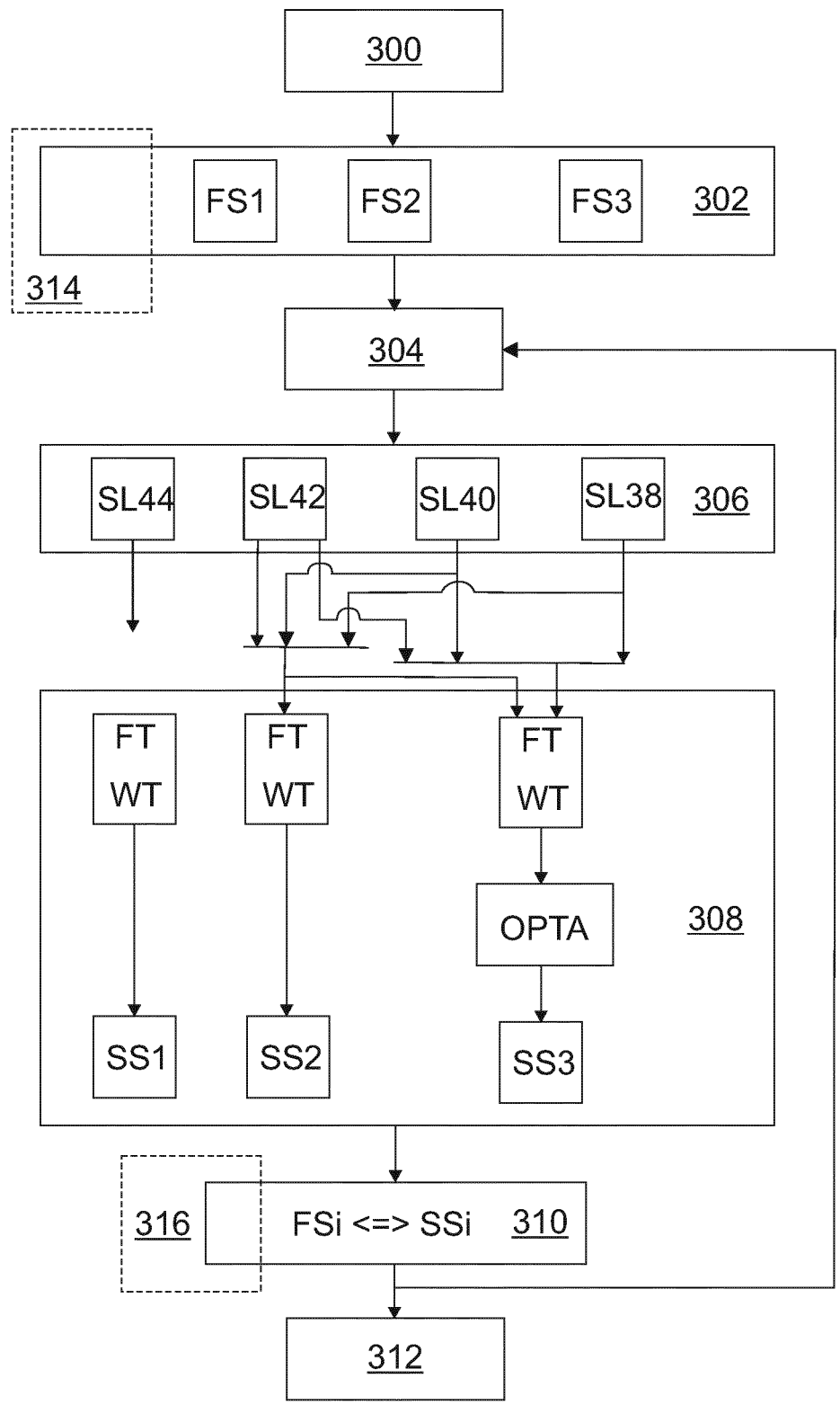
FIG. 4 provides a schematic illustration of a monitoring method in accordance with a first preferred embodiment of the invention.

FIG. 4 provides a schematic illustration of a monitoring method in accordance with a first embodiment of the invention. The monitoring method is adapted for monitoring a machining system. The machining system may correspond to the first and/or to the third embodiment of the invention. The machining apparatus may be the abrasive waterjet cutting system or a milling machine, or a lathe machine. Other machining apparatus are considered.

The monitoring method may include the following steps, notably performed in the following order:
  initialization 300;
  defining 302 at least one first signature (FS1; FS2; FS3), notably a first benchmark signature, at least on the basis of the first signal and notably the second signal from the first sensor and the second sensor respectively;

machining 304 the workpiece, also designated as operating the machining apparatus in order to shape the workpiece;

measuring 306 the machining conditions of the workpiece and/or of the machining apparatus by means of the plurality of sensors during the step machining 304, in order to obtain a plurality of signals (SL44; SL42; SL40; SL38);

computing 308 at least one second signature (SS1; SS2; SS3) at least on the basis of a first signal and notably the second signal measured during step machining;

comparing 310 the first signatures (FS1; FS2; FS3) against the respective second signatures (SS1; SS2; SS3); and optionally output 312.

Step initialization 300 may comprise a first installation of a guide such as a nozzle, or of a cutting tool. Step initialization 300 may comprise a maintenance operation of the machining apparatus. During such maintenance, a nozzle or a cutting tool may be temporary removed for inspection. Step initialization 300 may be carried out at regular time interval.

During step defining 302, the at least one first signature may comprise several first signatures, for instance a first signature FS1, a first signature FS2, and a third signature FS3. Other first signatures FSj may be defined. These first signatures (FSi) may also be defined by means of the third sensor, the fourth sensor, and possibly other sensors. The respective signals may be used and computed in order to obtain the first signature. The first signatures may be benchmark signatures.

Step defining 302 may comprise the same computing operations than step computing 308. Thus, the first signature (FS1; FS2; FS3) and the second signature (SS1; SS2; SS3) may be obtained through the same calculations, and on the basis of the same signals. The computing operations of step computing 308 will be detailed further latter on. As an option the first signature may comprise a numerical data, for instance a deterministic knowledge which, by contrast over the second signature, is added. As an alternative, the numerical data may replace a corresponding data of the second signature (SS1; SS2; SS3).

As an option, the signals (SL38; SL40; SL42; SL44) may be filtered for the purpose of step calculation 302, and for the purpose of step computing 308. The signals (SL38; SL40; SL42; SL44) may be filtered in the same manner for each of these two steps. The signals (SL38; SL40; SL42; SL44) may be filtered with an anti-leakage filter and/or with an anti-aliasing filter. The filtering may be carried out after the extraction of portions of finite lengths from the respective signals, notably as mentioned below.

During step computing 308, the first signal and the second signal and possibly additional signals are continuously provided. These signals may be provided by the first sensor, the second sensors and additional sensors respectively. Step computing 308 and/or step defining 302 may use at least: a first portion of finite length of the first signal, and notably a second portion of finite length of the second signal. The first portion and the second portion may begin at the same time and may last the same duration. These portions may last from 1 to 60 seconds. Optionally, these portions last 10 seconds. After that the use of an initial first or second portion, subsequent first and second portions are calculated similarly. Thus, the monitoring process is iteratively repeated.

The plurality of sensors may comprise accelerometers attached to the machining apparatus (202); for instance: the first accelerometer sensor, the second accelerometer sensor, the third accelerometer sensor, and possibly further accelerometers sensors as mentioned in relation with FIGS. 1 and 3. These accelerometer sensors may provide the signals (SL42; SL40; SL38). These accelerometers may form pairs of accelerometers. The number of pairs may correspond to all the possible combinations that may be theoretically defined. As an example, four accelerometers may define six pairs of accelerometers. As a general approach, it may be considered that the number of pairs is equal to $N*(N-1)/2$; wherein N correspond to the number of accelerometers attached to the machining apparatus (202).

Step machining 304 and step measuring 306 may be carried out simultaneously. Step measuring 306 may be performed at a sampling frequency equal or above 5 kHz.

Step computing 308 and step defining 302 may comprise calculation of the vibration transmissibilies between the accelerometers of the pairs of accelerometers by means of an Operational Transfer Path Analysis (OTPA) approach. The calculated vibration transmissibilies may be arranged in an $N*N$ matrix, wherein N corresponds to the number of accelerometers in the plurality of sensors. The vibration transmissibilies, and notably the $N*N$ matrix, may be part of the first signature (FS1; FS2; FS3) and the second signature (SS1; SS2; SS3), possibly each first signature (FS1; FS2; FS3) and each second signature (SS1; SS2; SS3). The second signature (SS1; SS2; SS3) may be instantaneous signatures.

As an option or an alternative to the accelerometer sensors, the plurality of sensors comprises strain gauges attached to the machining apparatus (202), notably the first strain gauge sensor to the third strain gauge sensor. Several pairs of strain gauges may be defined. These pairs may correspond to all possible pair combinations of strain gauges. Step computing 308 and step defining 302 may comprise the calculation of the vibration transmissibilies between the strain gauges of each pair of strain gauges. The so calculated vibration transmissibilies may be arranged in an $N*N$ matrix, wherein N corresponds to the number of accelerometers in the plurality of sensors. These vibration transmissibilies, and notably the $N*N$ matrix, may be part of the first signature (FS1; FS2; FS3) and the second signature (SS1; SS2; SS3), possibly each first signature (FS1; FS2; FS3) and each second signature (SS1; SS2; SS3).

The machining apparatus may comprise a cutting tool with a cutting edge. The machining apparatus may be a milling machine, or a lathe machine. These machines each shape the workpiece by material removal through physical contact with the cutting tool sharp edge. The plurality of sensors may comprise a tool sensor providing a tool signal. More precisely, the tool sensor may be adapted for sensing the vibrations of the cutting edge.

The tool signal from said tool sensor may be used during step defining 302 and during step computing 308 and be part of the first signature (FS1; FS2; FS3) and of the second signature (SS1; SS2; SS3). Said machining apparatus may be an abrasive waterjet cutting apparatus with a nozzle configured for guiding the abrasive jet. Said nozzle is considered as a cutting tool. Consequently, and accordingly to the embodiments of FIG. 1 and FIG. 3, any accelerometer attached thereon has to be considered as the tool sensor.

The plurality of sensors may comprise a workpiece sensor providing a workpiece signal (SL44) which is used during step defining 302 and during step computing 308 and be part of the first signature (FS1; FS2; FS3) and of the second signature (SS1; SS2; SS3).

Step computing 308 and/or step defining 302 may each comprise the calculation of the Fourier Transform or the Wavelet Transform of the first signal and the second signal (SS1; SS2; SS3), or of each signal from the plurality of sensors. The corresponding Fourier Transforms FT or the corresponding Wavelet Transforms WT of each signal (SL38; SL40; SL42; SL44) from the plurality of sensors may be part of the first signature (FS1; FS2; FS3) and of the second signature (SS1; SS2; SS3). The Fourier Transforms FT or the corresponding Wavelet Transforms WT may be calculated after filtration as previously presented.

The first signature FS1 and the second signature SS1 may be calculated on the basis of the signal SL44 from the sensor(s) measuring the workpiece vibrations. The first signature FS2 and the second signature SS2 may be calculated on the basis of the first and/or the second and/or the third sensor, thus the signals SL38 and/or SL40 and/or SL42.

The first signature FS3 and the second signature SS3 may be calculated on the basis of the first signal SL38 and the second signal SL40, which are respectively provided by the first sensor, the second sensor. The first signature FS3 and the second signature SS3 may comprise an Operational Transfer Path Analysis (OPTA). As an option, the first signature FS3 and the second signature SS3 are additionally calculated by means of the third signal. In an embodiment of the invention, the monitoring method is only carried out with the first signature FS3 and the second signature SS3.

During step comparing 310, a potential deviation between the first signature (FS1; FS2; FS3) and the second signature (SS1; SS2; SS3), or between each first signature FSi and the corresponding second signature SSi is analysed. In the current example i=1; 2; or 3. The deviation may be assessed by a control logic of the monitoring device. Machine learning may be used in this context in order to improve relevance of the results.

The monitoring method may comprise a training period 314 during which operation conditions of the machining apparatus are changed in order to change the first signal, the second signal, possibly the third signal and any other signal. Thus, a library of first benchmark signatures may be created. The library of first benchmark signatures may be established on the basis of the sensor group comprising: the first sensor, the second sensor, the third sensor, the fourth sensors, further sensors; or any combination thereof. By way of example, the operation conditions may be changed by setting different cutting speeds, different worked materials, different worked geometries, different fluid pressures, or different abrasive feed rates. The training period 314 may be carried out, at least partially, during step defining 302.

The monitoring method, for instance step comparing 310, may comprise a step selecting 316 a first benchmark signature from the library, the selected first benchmark signature of the library being the one with the smallest difference between its machining conditions and the machining conditions corresponding to the second signature (SS1; SS2; SS3) and/or between features of the first signature (FS1; FS2; FS3) and features of the second signature (SS1; SS2; SS3). The differences may be assessed on the vibration spectrum; notably after calculations of the Fourier Transforms FT or the Wavelet Transforms WT.

Step output 312 may comprise communication of a message. It may request a message for intervention. It may comprise an instantaneous tracking of the product quality. As an option, a visual output is communicated through a Graphical User Interface (GUI). Analog and/or digital signals may be provided to a controller in order to automatically adjusting the operating parameters.

Figure 5:
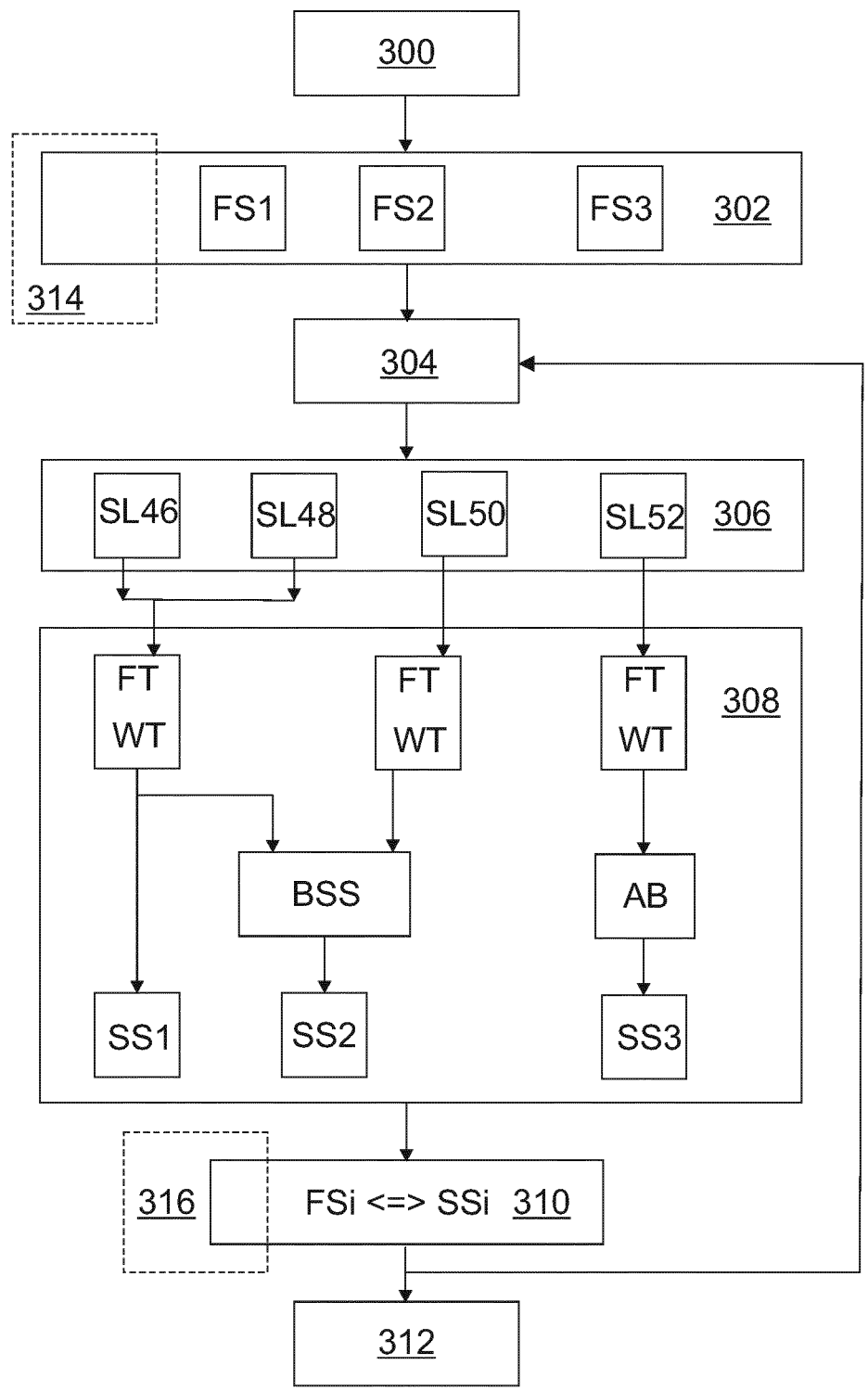
FIG. 5 provides a schematic illustration of a monitoring method in accordance with a second preferred embodiment of the invention.

FIG. 5 provides a schematic illustration of a monitoring method in accordance with a second embodiment of the invention. The monitoring method is adapted for monitoring a machining system. The machining system may correspond to the second and/or to the third embodiment of the invention.

The monitoring method may include the following steps, notably performed in the following order:
- initialization 300;
- defining 302 at least one first signature (FS1; FS2; FS3), notably a first benchmark signature, at least on the basis of the first signal SL46 and notably the second signal SL48 from the first sensor and the second sensor respectively;
- machining 304, or operating 304 the machining apparatus in order to shape the workpiece;
- measuring 306 the machining conditions of the workpiece and/or of the machining apparatus by means of the plurality of sensors during the step machining 304, in order to obtain a plurality of signals (SL48; SL50; SL52; SL46);
- computing 308 at least on second signature (SS1; SS2; SS3) at least on the basis of a first signal SL46 and notably the second signal SL48 measured during step machining 304;
- comparing 310 the first signature (FS1; FS2; FS3) against the corresponding second signature (SS1; SS2; SS3); and optionally
- output 312.

Step initialization 300 may comprise a first installation of a guide such as a nozzle, or of a cutting tool. Step initialization 300 may comprise a maintenance operation of the machining apparatus. During such maintenance, a nozzle or a cutting tool may be temporary removed for inspection. Step initialization 300 may be carried out at regular time intervals.

During step defining 302, the at least one first signature may comprise several first signatures, for instance a first signature FS1, a first signature FS2, and a third signature FS3. Other first signatures FSj may be defined, wherein "j" stands for a numerical indicium. These first signatures (FSi) may also be defined by means of the third sensor, the fourth sensor, and possibly other sensors. The respective signals may be used and computed in order to obtain the first signature(s). The first signatures may be benchmark signatures.

Step defining 302 may comprise the same computing operations than step computing 308. Thus, the first signature (FS1; FS2; FS3) and the second signature (SS1; SS2; SS3) may be obtained through the same calculations, and on the basis of the same signals. The computing operations of step computing 308 will be detailed further latter on. As an option the first signature may comprise a numerical data, for instance a deterministic knowledge which, by contrast over the second signature, is added. The numerical data may comprise a theorical data. As an alternative, the numerical data may replace a corresponding data of the second signature (SS1; SS2; SS3).

As an option, the signals (SL48; SL50; SL52; SL46) may be filtered for the purpose of step calculation 302, and for the purpose of step computing 308. The signals (SL48; SL50; SL52; SL46) may be filtered in the same manner for each of these two steps. The signals (SL48; SL50; SL52; SL46) may be filtered with an anti-leakage filter and/or with an anti-aliasing filter. The filtering may be carried out after the extraction of portions of finite lengths from the respective signals, notably as mentioned below.

During step computing 308, the first signal SL46 and the second signal SL48 and possibly additional signals are continuously provided. These signals (SL48; SL50; SL52; SL46) may be provided by the first sensor, the second sensors and additional sensors respectively. Step computing 308 and/or step defining 302 may use at least: a first portion of finite length of the first signal SL46, and notably a second portion of finite length of the second signal SL48. The first portion and the second portion may begin at the same time and may last the same duration. These portions may last from 1 to 60 seconds. Optionally, these portions last about 10 seconds. After that the use of an initial first or second portion, subsequent first and second portions are calculated similarly. Thus, the monitoring process is iteratively repeated.

The plurality of sensors may comprise microphone sensors; for instance: the first microphone sensor, the second microphone sensor, the third microphone sensor, the fourth microphone sensor, and possibly further microphone sensors as mentioned in relation with FIGS. 2 and 3. These microphone sensors may provide the signals (SL48; SL50; SL52; SL46).

Step machining 304 and step measuring 306 may be carried out simultaneously. Step measuring 306 may be performed at a sampling frequency of at least 5 kHz.

The machining apparatus may comprise a cutting tool with a cutting edge. The machining apparatus may be a milling machine, or a lathe machine. These machines each shape the workpiece by material removal through a physical contact with the cutting tool sharp edge. The plurality of sensors may comprise a tool sensor providing a tool signal. More precisely, the tool sensor may be adapted for sensing the acoustic emission generated by the mechanical contact of the cutting tool with the workpiece. The tool signal from said tool sensor may be used during step defining 302 and during step computing 308 and be part of the first signature (FS1; FS2; FS3) and of the second signature (SS1; SS2; SS3). Said machining apparatus may be an abrasive waterjet cutting apparatus with a nozzle shaped for guiding the abrasive jet. Said nozzle has to be intended as the cutting tool. Consequently, and accordingly to the embodiments of FIG. 2 and FIG. 3, any microphone nearby the cutting tool has to be considered as the tool sensor.

The plurality of sensors may comprise a workpiece microphone sensor providing a workpiece signal which is used during step defining 302 and during step computing 308 for the first signature (FS1; FS2; FS3) and the second signature (SS1; SS2; SS3). The workpiece microphone may be the same sensor as the tool sensor.

Step computing 308 and/or step defining 302 may each comprise the calculation of the Fourier Transform or the Wavelet Transform of the first signal and the second signal, or of each signal from the plurality of sensors. The corresponding Fourier Transforms FT or the corresponding Wavelet Transforms WT of each signal (SL48; SL50; SL52; SL46) from the plurality of sensors may be part of the first signature (FS1; FS2; FS3) and of the second signature (SS1; SS2; SS3). The Fourier Transforms FT or the corresponding Wavelet Transforms WT may be calculated after filtration as previously detailed.

At least the first sensor and the second sensor comprise microphones. The microphones may be dedicated to identified sound sources such as the cutting means, the workpiece, a pump, an engine, a transmission. The first signature FS1 and the second signature SS1 may be calculated on the basis of the signal SL48 from the tool sensor(s) and/or the signal SL46 from the workpiece sensor. After an optional filtration, the Fourier Transform FT or the Wavelet Transform WT of the signal SL48 is calculated in order to obtain the signatures FS1 and SS1.

The first signature FS3 and the second signature SS3 may be calculated on the basis of the signal SL52 from the fourth microphone sensor. The latter may be an array of N microphones, which form a beamforming antenna. Consequently, SL46 has to be considered as a set of array signals. Their Fourier Transform FT or their Wavelet Transform WT or their cross-spectral matrix may be calculated. An acoustic beamforming (AB) method may be applied to the set of array signals SL52 in order to provide localization and characterization of acoustic sources. To the scope, a computation grid may be defined. Said computation grid may be the work plan of the machining apparatus or any other plan parallel to it, and overlay this information on a computed picture of the environment. Consequently, relevant sound sources may be localized on the computation grid and characterized. The computation grid may be overlaid on the images from a CCD camera, providing an acoustic video. The acoustic video and/or the computation grid may be used for the signatures FS3 and SS3.

The first signature FS2 and the second signature SS2 may be calculated on the basis of the second signal SL48 and/or the third signal SL50 and/or the first signal SL46, which are provided by tool sensor, the third microphone sensor and the workpiece sensor, respectively. After calculation of the Fourier Transform FT and/or the Wavelet Transform WT of signals SL48, SL50 and SL52 a net signal is calculated. The net signal may be computed by means of a separation technique using the intermediate signals. In an option, the separation technique may be a Blind Separation Technique (BSS). Therethrough, the first signature FS2 and the second signature SS2 may be obtained.

As a general aspect of the invention, it may be considered that the monitoring method comprises extraction(s) of finite length portions of the first signal and of the second signal, then filtering of the finite length portions, then the calculation or the Fourier Transform(s) FT and/or the Wavelet Transform(s) WT of the filtered finite length portions, and then a calculation with a separation technique and/or an acoustic beamforming.

During step comparing 310, a potential deviation between the first signature (FS1; FS2; FS3) and the second signature (SS1; SS2; SS3), or between each first signature FSi and the corresponding second signature SSi, is analysed. In the current example i=1; 2; or 3. The deviation may be assessed by a control logic of the monitoring device. Machine learning may be used in this context in order to improve relevance of the results.

The monitoring method may comprise a training period 314 during which operation conditions of the machining apparatus are changed in order to intentionally change the first signal SL46, the second signal SL48, the third signal and any other signal. Thus, a library of first benchmark signatures may be created. The library of first benchmark signatures may be established on the basis of the sensor group comprising: the first sensor, the second sensor, the third sensor, the fourth sensors, further sensors; or any combination thereof. By way of example, the operation conditions may be changed by setting different cutting speeds, different fluid pressures, or different abrasive feed rates. The training period 314 may be carried out, at least partially, during step defining 302.

The monitoring method, for instance step comparing 310, may comprise a step selecting 316 a first benchmark signature from the library, the selected first benchmark signature of the library being the one with the smallest difference between its operating conditions and the operating conditions corresponding to the second signature (SS1; SS2; SS3) and/or between features of the first signature (FS1; FS2; FS3) and features of the second signature (SS1; SS2; SS3). The differences may be assessed on the vibration spectra; notably after calculations of the Fourier Transforms FT or the Wavelet Transforms WT.

Step output 312 may comprise communication of a message. It may request a message for intervention. It may comprise an instantaneous tracking of the product quality. As an option, a visual output is communicated through a Graphical User Interface (GUI). Analog signals may be provided to a controller in order to automatically adjusting the operating parameters of step machining 304.

According to an embodiment of the invention, the plurality of sensors comprises accelerometer sensors and microphone sensors, and possibly strain gauge sensors. These sensors provide a plurality of signals, the first signature and the second signature being each computed by means of said plurality of signals. By way of example, the signatures may comprise a (A+SG)*(A+SG) matrix, wherein A correspond to the number of accelerometers and SG corresponds to the number of strain gauges. The (A+SG)*(A+SG) matrix may merge the N*N matrix as describes in the first embodiment and the hereabove second embodiment, being N equal to A+SG.

Figure 6:
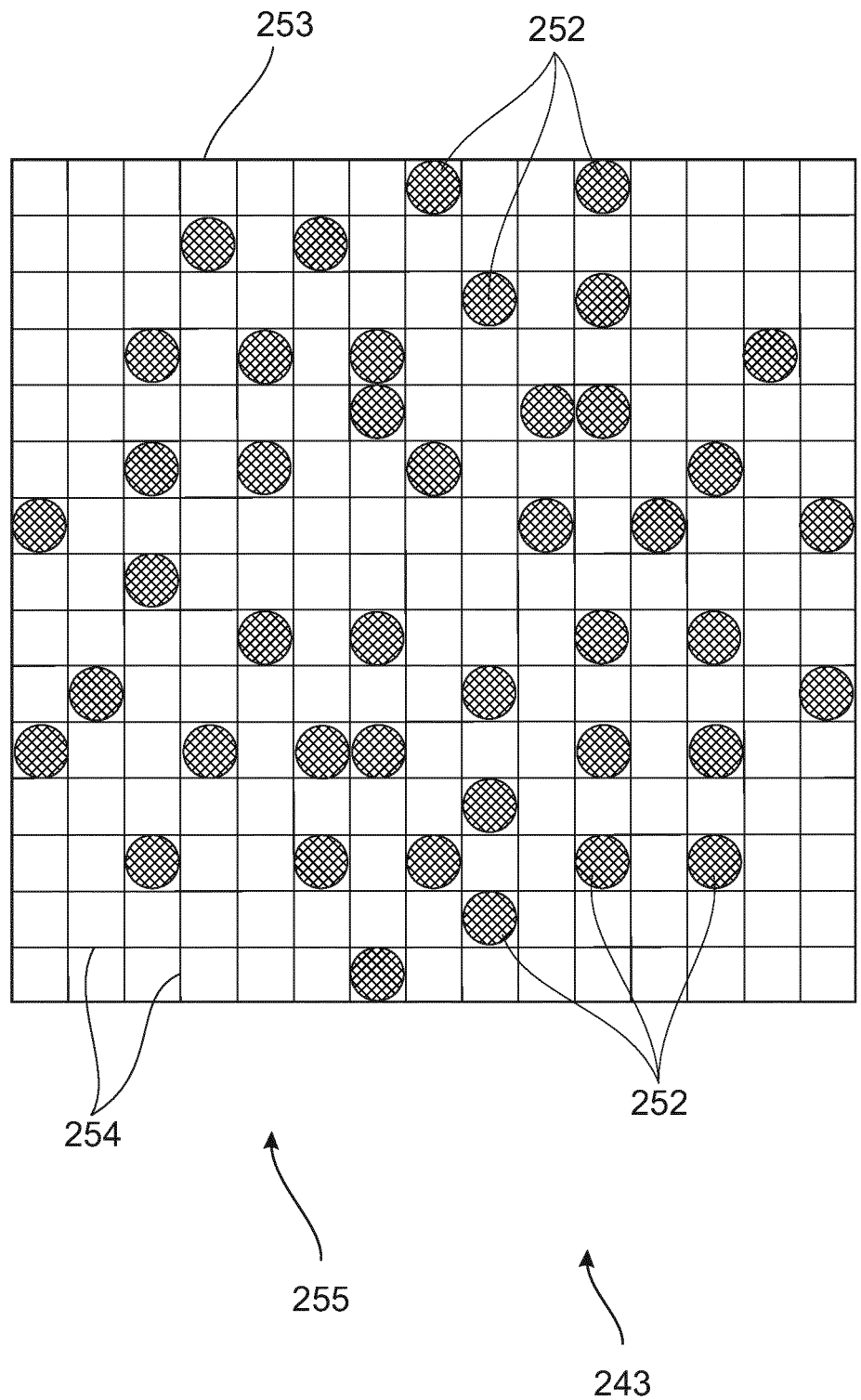
FIG. 6 provides a schematic illustration of an array of microphones in accordance with a preferred embodiment of the invention.

FIG. 6 represents an array 255 of fourth microphones sensors 252. The fourth microphones sensors 252 may form a grid 254, as presented in relation with anyone of FIGS. 2 and 3.

The fourth sensor 243 may comprise at least one fourth microphone sensor 252 or a set of fourth microphone sensors 252 possibly defining an array 255 of microphones. The array 255 comprises at least four microphones sensors 252. Optionally, it comprises at least: ten microphones sensors 252. The number of ten is interesting as it provides a relevant robustness and allows a precise diagnostic in the context of machining Valuable results have been obtained in relation with an abrasive waterjet cutting system. As a further option, the array comprises at least: twenty, or forty, or sixty microphones sensors 252.

The array 255 comprises an outer frame 253. The outer frame 253 forms the outer edges of the array 255, and may surround the fourth microphones sensors 252. The frame 253 may measure at most 1.00 m. In addition, the frame may delimit the grid 254. The grid 254 form the fixation support receiving the fourth microphones sensors 252. The recesses through said grid form as much fixation, or reception areas for the fourth microphones sensors 252. Therein, the fourth microphones sensors 252 may be oriented toward the cutting head.

The grid 254 provides N array positions in the plane of the grid 254, where M microphones 252 are mounted. In the current example, 42 microphones are distributed in the 225 array positions. Said positions can determine different patterns, notably regular, random or spiral. Said array of microphones 252 provide a set of M array signals.

The grid 254 may form a rectangle. It may be planar, in the meaning that it exhibits a flat main surface. The fourth microphones sensors 252 may be arranged in order to form a rectangle on said grid 254, or may describe a spiral. As an alternative, the fourth microphones sensors may be distributed randomly in the array 255.

The invention considers a machining system with a monitoring device comprising the array 255 of microphones of FIG. 6; optionally the monitoring device comprise a plurality of sensors formed and/or constituted by the array 255 of microphones of FIG. 6.

The invention provides a preferred embodiment including a machining apparatus 202 as described in relation with any of FIGS. 1 to 5, and their combinations; and an array 255 and/or a grid 254 of microphones 252 as describe in relation with any of FIGS. 2, 3 and 6, and their combinations.

Figure 7:
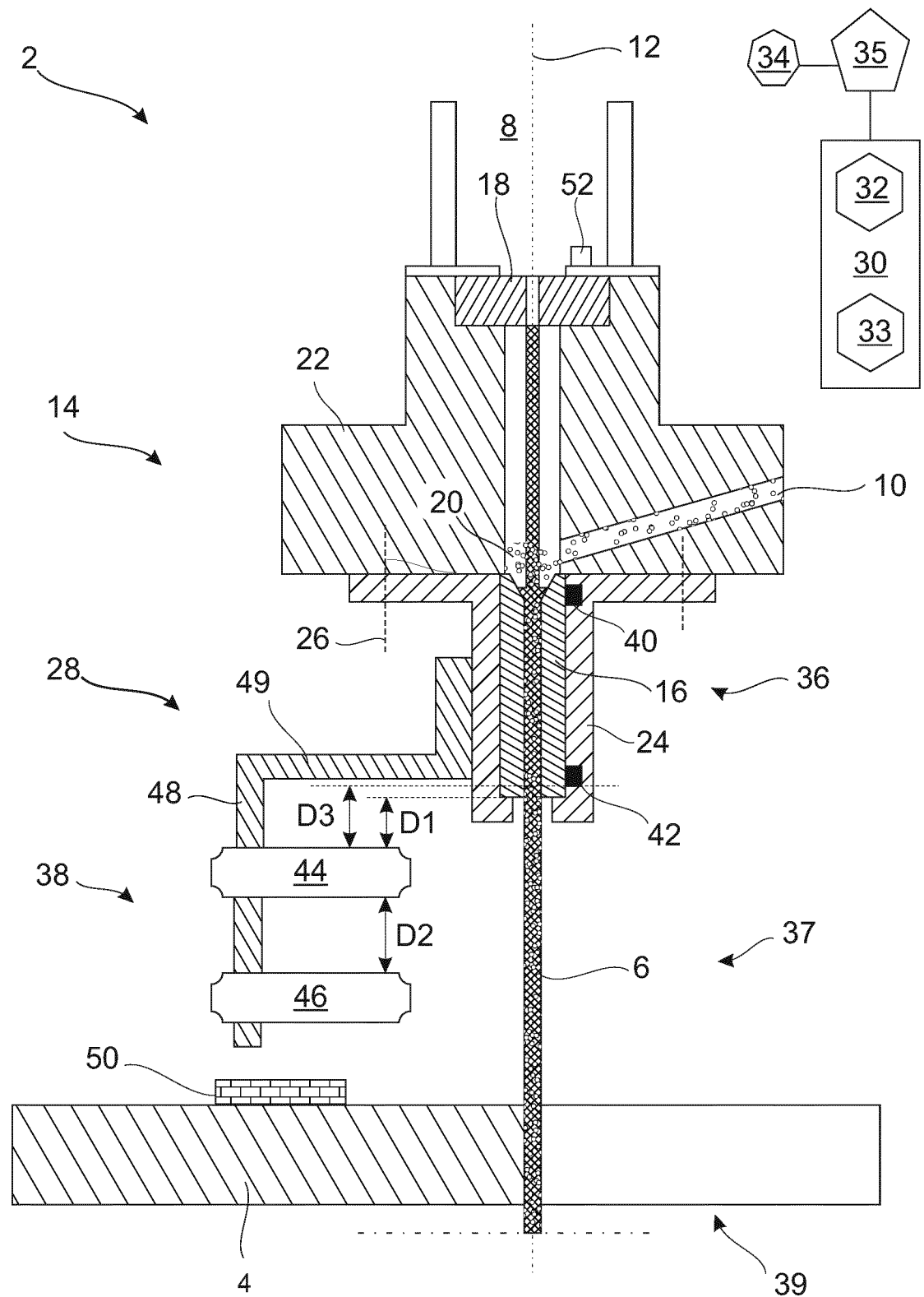
FIG. 7 provides a schematic illustration of a cut through an AWJ system in accordance with a first preferred embodiment of the invention.

FIG. 7 shows a cross section of an abrasive waterjet cutting system 2 in accordance with a fourth embodiment of the invention. The abrasive waterjet cutting system 2 is represented above a workpiece 4 which is currently cut by the abrasive cutting waterjet 6. The current cross section is taken along the cut-out of the workpiece 4 which is represented with hatchings before the kerf, and which is hatching free on the kerf created by the abrasive cutting waterjet 6. Despite the workpiece 4 is represented under the abrasive waterjet cutting system 2, it is encompassed in the current invention any other orientation. For instance, the workpiece 4 may be beside the abrasive waterjet cutting system 2, and the abrasive cutting waterjet 6 may flow horizontally.

The abrasive waterjet cutting system 2 may include a high-pressure fluid source 8, notably a high-pressure water source or high-pressure water vessel. In the current figure, the high-pressure fluid source 8 is arbitrarily cut and may extend further upstream. Similarly, the cutting abrasive waterjet 6 is arbitrarily interrupted downstream the workpiece 4 for representation purpose, and may flow further downstream, notably in a through cut configuration. The high-pressure fluid source 8 is adapted for providing the fluid at a pressure ranging from 2500 bars to 6900 bars. For instance, the fluid pressure is about 4000 bars. The abrasive waterjet cutting system 2 may also comprise an abrasive particle supply 10.

The abrasive waterjet cutting system 2 exhibits an abrasive waterjet flow direction 12 and an abrasive waterjet cutting head 14 with a nozzle 16 adapted for guiding the abrasive waterjet 6 along the abrasive waterjet flow direction 12, and adapted for transferring momentum from fluid to particles. The nozzle 16 is also known as a "focussing tube".

The abrasive waterjet flow direction 12 may be considered as a geometrical axis. It is directed from the abrasive waterjet (AWJ) cutting head 14 toward the workpiece 4. It projects beyond the workpiece 4 and the abrasive waterjet cutting system 2. It may be colinear with the abrasive cutting waterjet 6.

An orifice 18 may be in fluid communication with the high-pressure fluid source 8. It may guide a high-speed waterjet toward the nozzle 16. Upstream the orifice 18, water may have a high-pressure, and downstream the orifice 18 it may have a high-speed. The high-speed water jet may be a single-phase water jet. The high-speed water jet may accelerate the abrasive particles received in a mixing chamber 20. More precisely, the acceleration of particles is provided by momentum transfer with the high-speed water jet, and the momentum transfer may essentially take place in the nozzle 16. The abrasive waterjet cutting system 2 may be adapted such that the abrasive cutting waterjet 6 reaches a speed in the range of 300-1200 m/s downstream the nozzle 16. The abrasive cutting waterjet 6 may be a three phases waterjet, and may include water, air and particles in suspension. The abrasive waterjet cutting head 14 may include a main support 22. The main support 22 may bear the orifice 18, and/or may be in contact with the high-pressure fluid source 8. The mixing chamber 20 may be formed therein. The abrasive particle supply 10 may cross it.

The abrasive waterjet cutting head 14 may comprise a casing 24 supporting the nozzle 16. The casing 24 may encapsulate the nozzle 16. The casing 24 may form a sleeve surrounding the nozzle 16. The casing 24 may be colinear with the abrasive waterjet flow direction 12. The casing 24 may be in contact of the main support 22. It may be fixed thereon, notably by reversible fixation means 26 such as screws. These reversible fixation means 26 permit a fast access to the nozzle 16 in order to replace it, for instance during a maintenance operation requiring a nozzle replacement subsequently to an excessive wear state detection.

In order to assess the functioning of the abrasive waterjet cutting system 2, a monitoring device 28 is provided. The latter is adapted for measuring at least one wear characteristic or the wear characteristics of the nozzle 16, and/or at least one characteristic of the abrasive waterjet 6 or the characteristics of the abrasive waterjet 6, or at least one alignment characteristic or the alignment characteristics of the nozzle 16 with the orifice 18. The abrasive jet characteristic may be a feature strictly depending on the acoustic pressure it generates and can be related to the quality of the cut it produces. In other words, the sound generated by the waterjet is measured, therefrom a feature is extracted, and according to that feature it may be monitored whether the cut is good or compromised.

The monitoring device 28 may be connected to a computer 30 in order to process signals. More precisely, the computer 30 may include a computer readable medium 32 on which a computer program is stored, and a central processing unit (CPU) 33 which is adapted for carrying out the instructions of the computer program. The monitoring device 28 may include a preamplifier 34 connected to the computer 30, and amplifying electric signals from sensors, notably the sensors as set forth below. An acquisition board 35 with an A/D converter may connect the preamplifier 34 to the computer 30.

The monitoring device 28 includes at least one set of sensors. The monitoring device 28 may include two sets of sensors, with a first set 36 of sensors and a second set of sensors 38. These sets of sensors may be an upstream set 36 of sensors associated to the nozzle, and a downstream set 38 of sensors arranged in the cutting area 37 between the nozzle 16 and the workpiece 4. Each set of sensors may consist in a pair of sensors. In each set, the sensors may be at distance with respect to the abrasive waterjet 6, or to the axis formed by the former.

The abrasive waterjet cutting system 2 may exhibit a workpiece reception area 39. The workpiece reception area 39 may enclose fixation elements (not represented) for fixing the workpiece 4 to the framework of the system 2.

The upstream set 36 may include accelerometers (40; 42), notably an upstream accelerometer 40 and a downstream accelerometer 42. The accelerometers (40; 42) may be fixed to the nozzle 16; for instance by gluing or by screws (not represented) engaging the casing 24. The accelerometers (40; 42) may be disposed in the thickness of the casing 24.

The signal from the upstream accelerometer 40 may be correlated to the conditions under which the pure waterjet from the orifice 18 impinges the inlet section of the nozzle 16. Data processing performed by the computer 30 enables a misalignment detection between the orifice 18 and the facing nozzle 16. Computing the signals of both accelerometers (40; 42) allows at least to measure the nozzle wear.

The accelerometers (40; 42) may be nano-accelerometers. The accelerometers (40; 42) may be three dimensional accelerometers, which are adapted for measuring accelerations and thus vibrations of the nozzle 16 in three perpendicular directions.

The downstream set 38 may include microphones (44; 46), notably an upstream microphone 44 and a downstream microphone 46. At this location, the microphones (44; 46) are sensitive to the sound produced by the workpiece 4. Within the corresponding set, the upstream microphone 44 is the nearest from the nozzle outlet whereas the downstream microphone 46 is the nearest from the workpiece 4.

These microphones (44; 46) are arranged between the lower end of the casing 24 and the upper face of the workpiece 4. Thus, the microphones (44; 46) may be arranged in the cutting area 37. The microphones (44; 46) are adapted for measuring acoustic pressure downstream the abrasive waterjet cutting head 14, and in turn for measuring sound generated by the abrasive cutting waterjet 6 which permits to obtain a jet characteristic.

The abrasive waterjet cutting system 2 may include a frame 48. The frame 48 receives the upstream microphone 44 and the downstream microphone 46. The frame 48 may include a transversal portion 49. This transversal portion 49 may project perpendicularly from the abrasive waterjet flow direction 12, and/or from the abrasive cutting waterjet 6. The transversal portion 49 permits to set a fixed distance between the microphones and the abrasive cutting waterjet 6.

The frame 48 is adapted for maintaining a constant distance D2 between the microphones (44; 46). This distance D2 may be larger than a distance D1 between the outlet end of the nozzle 16 and the upstream microphone 44. This means that, along the abrasive waterjet flow direction 12, the upstream microphone 44 may be closer to the nozzle 16 than to the downstream microphone 46. As apparent from FIG. 7, the set 36 of accelerometers (40; 42) and the set 38 of microphones (44; 46) may be distant and distinct. They may be geometrically separated with respect to the abrasive waterjet flow direction 12. Indeed, there may be a distance D3 between the sets of sensors. The distance D3 may also be set by the frame 48.

The distances (D1; D2; D3) may be considered along the abrasive waterjet flow direction 12. The abrasive waterjet cutting system 2 may comprise a workpiece sensor, notably a piezoelectric sensor 50. The piezoelectric sensor 50 may be added to the abrasive waterjet cutting system 2. The piezoelectric sensor 50 is adapted for measuring vibrations. It may be associated with the workpiece 4, and may notably be fixed thereon on the face in front of the abrasive waterjet cutting head 14. In this configuration, the piezoelectric sensor 50 permits to sense vibrations generated and/or borne by the workpiece 4; notably in response to the cutting operation of the abrasive cutting waterjet 6.

The abrasive waterjet cutting system 2 may enclose an orifice sensor 52. The orifice sensor 52 may be upstream the orifice 18. The position in the current figure is merely illustrative. The orifice sensor 52 is structurally and functionally adapted for measuring the fluid pressure upstream the orifice 18. The orifice sensor 52 may be a strain gauge sensor, for instance adapted for measuring pressure applied on its support. The pressure upstream the orifice 18 may then be estimated, notably in order to estimate the orifice wear.

Figure 8:
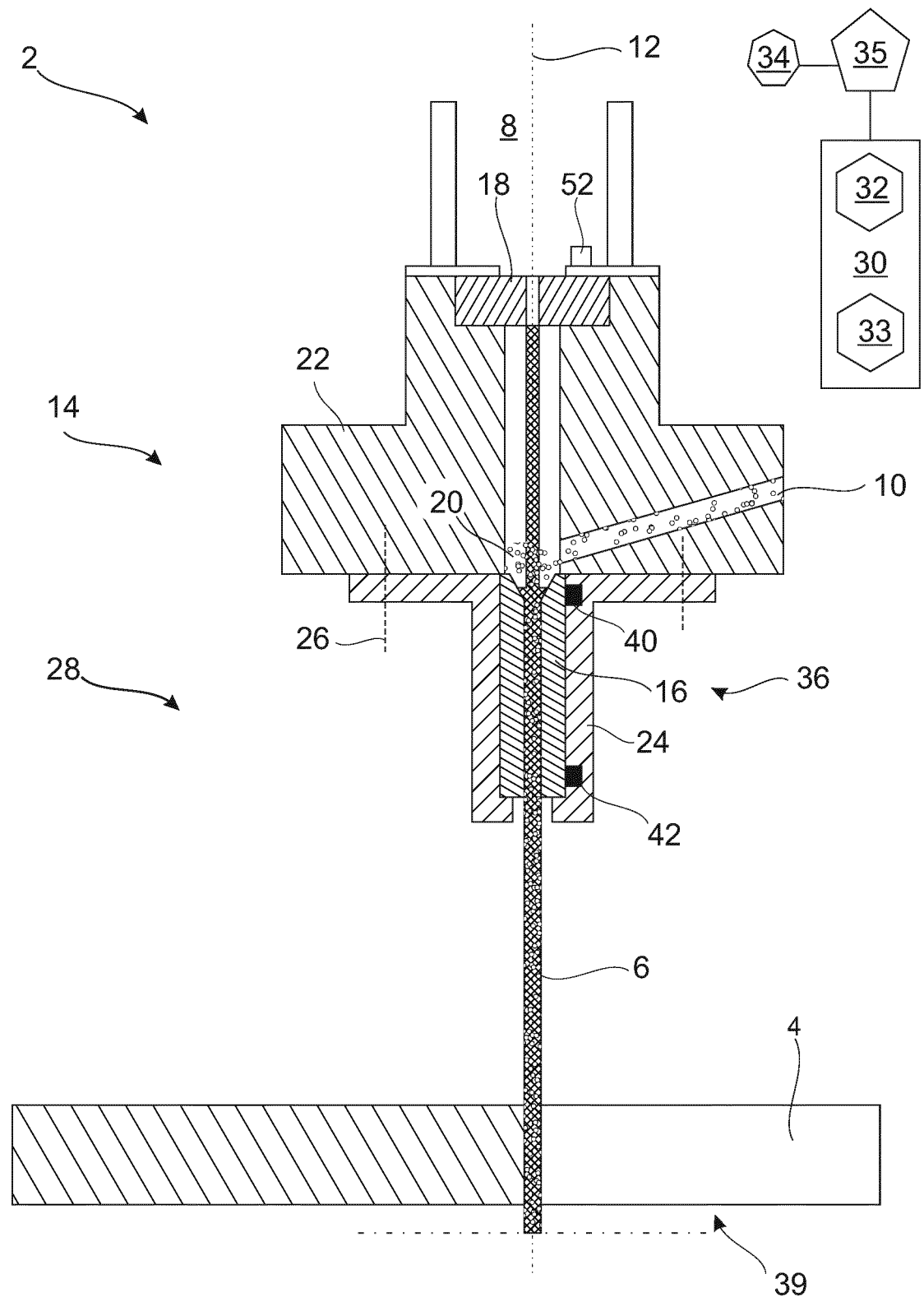
FIG. 8 provides a schematic illustration of a cut through an AWJ system in accordance with a second preferred embodiment of the invention.

FIG. 8 shows a cross section of an abrasive waterjet cutting system 2 in accordance with a fifth embodiment of the invention. The fifth embodiment of the invention is substantially similar to the first to fourth embodiment. The fifth embodiment may be essentially free of the microphones which have been previously presented.

The abrasive waterjet cutting system 2 is represented above a workpiece 4 which is currently cut by the abrasive cutting waterjet 6. The current cross section is taken along the cut-out of the workpiece 4 which is represented with hatchings before the kerf, and which is hatching free on the kerf created by the abrasive cutting waterjet 6. Despite the workpiece 4 is represented under the abrasive waterjet cutting system 2, it is encompassed in the current invention any other orientation. For instance, the workpiece 4 may be beside the abrasive waterjet cutting system 2, and the abrasive cutting waterjet 6 may flow horizontally.

The abrasive waterjet cutting system 2 may include a high-pressure fluid source 8, notably a high-pressure water source or high-pressure water vessel. In the current figure, the high-pressure fluid source 8 is arbitrarily cut and may extend further upstream. Similarly, the cutting abrasive waterjet 6 is arbitrarily interrupted downstream the workpiece 4 for representation purpose, and may flow further downstream, notably in a through cut configuration. The high-pressure fluid source 8 is adapted for providing the fluid at a pressure ranging from 2500 bars to 6900 bars. For instance, the fluid pressure is about 4000 bars. The abrasive waterjet cutting system 2 may also comprise an abrasive particle supply 10.

The abrasive waterjet cutting system 2 exhibits an abrasive waterjet flow direction 12 and an abrasive waterjet cutting head 14 with a nozzle 16 adapted for guiding the abrasive waterjet 6 along the abrasive waterjet flow direction 12 and transferring momentum from fluid to particles. The nozzle 16 is also known as a "focussing tube".

The abrasive waterjet flow direction 12 may be considered as a geometrical axis. It is directed from the abrasive waterjet cutting head 14 toward the workpiece 4. It projects beyond the workpiece 4 and the abrasive waterjet cutting system 2. It may be colinear with the abrasive cutting waterjet 6.

An orifice 18 may be in fluid communication with the high-pressure fluid source 8. It may guide a high-speed waterjet toward the nozzle 16. Upstream the orifice 18, water may have a high-pressure, and downstream the orifice 18 it may have a high-speed. The high-speed water jet may be a single-phase water jet. The high-speed water jet may accelerate the abrasive particles received in a mixing chamber 20. More precisely, the acceleration of particles is provided by momentum transfer with the high-speed water jet, and the momentum transfer may essentially take place in the nozzle 16.

The abrasive waterjet cutting system 2 may be adapted such that the abrasive cutting waterjet 6 reaches a speed in the range of 300-1200 m/s downstream the nozzle 16. The abrasive cutting waterjet 6 may be a three phases waterjet, and may include water, air and particles in suspension. The abrasive waterjet cutting head 14 may include a main support 22. The main support 22 may bear the orifice 18, and/or may be in contact with the high-pressure fluid source 8. The mixing chamber 20 may be formed therein. The abrasive particle supply 10 may cross it.

The abrasive waterjet cutting head 14 may comprise a casing 24 supporting the nozzle 16. The casing 24 may encapsulate the nozzle 16. The casing 24 may form a sleeve surrounding the nozzle 16. The casing 24 may be colinear with the abrasive waterjet flow direction 12. The casing 24 may be in contact of the main support 22. It may be fixed thereon, notably by reversible fixation means 26 such as screws. These reversible fixation means 26 permit a fast access to the nozzle 16 in order to replace it, for instance during a maintenance operation requiring a nozzle replacement subsequently to an excessive wear state detection.

In order to assess the functioning of the abrasive waterjet cutting system 2, a monitoring device 28 is provided. The latter is adapted for measuring at least one wear characteristic or the wear characteristics of the nozzle 16, or at least one alignment characteristic or the alignment characteristics of the nozzle 16 with the orifice 18. The abrasive jet characteristic may be a feature strictly depending on the acoustic pressure it generates and can be related to the quality of the cut it produces. In other words: the sound generated by the waterjet is measured, from a feature is extracted, and according to that feature it may be monitored whether the cut is good or compromised.

The monitoring device 28 may be connected to a computer 30 in order to process signals. More precisely, the computer 30 may include a computer readable medium 32 on which a computer program is stored, and a central processing unit (CPU) 33 which is adapted for carrying out the instructions of the computer program. The monitoring device 28 may include a preamplifier 34 connected to the computer 30, and amplifying electric signals from sensors, notably the sensors as set forth below. An acquisition board 35 with an A/D converter may connect the preamplifier 34 to the computer 30.

The abrasive waterjet cutting system 2 may exhibit a workpiece reception area 39. The workpiece reception area 39 may enclose fixation elements (not represented) for fixing the workpiece 4 to the framework of the system 2.

An upstream set 36 of sensors may include accelerometers (40; 42), notably an upstream accelerometer 40 and a downstream accelerometer 42. The accelerometers (40; 42) may be fixed against the nozzle 16; for instance, by gluing or by screws (not represented) engaging the casing 24. The accelerometers (40; 42) may be disposed in the thickness of the casing 24.

The signal from the upstream accelerometer 40 may be correlated to the conditions under which the pure waterjet from the orifice 18 impinges the inlet section of the nozzle 16. Data processing performed by the computer 30 enables a misalignment detection between the orifice 18 and the facing nozzle 16. Computing the signals of both accelerometers (40; 42) allows at least to measure the nozzle wear.

The accelerometers (40; 42) may be nano-accelerometers. The accelerometers (40; 42) may be three dimensional accelerometers, which are adapted for measuring accelerations and thus vibrations of the nozzle 16 in three perpendicular directions.

The abrasive waterjet cutting system 2 may enclose an orifice sensor 52. The orifice sensor 52 may be upstream the orifice 18. The position in the current figure is merely illustrative. The orifice sensor 52 is structurally and functionally adapted for measuring the fluid pressure upstream the orifice 18. The orifice sensor 52 may be a strain gauge sensor, for instance adapted for measuring pressure applied on its support. The pressure upstream the orifice 18 may then be estimated, notably in order to estimate the orifice wear.

Figure 9:
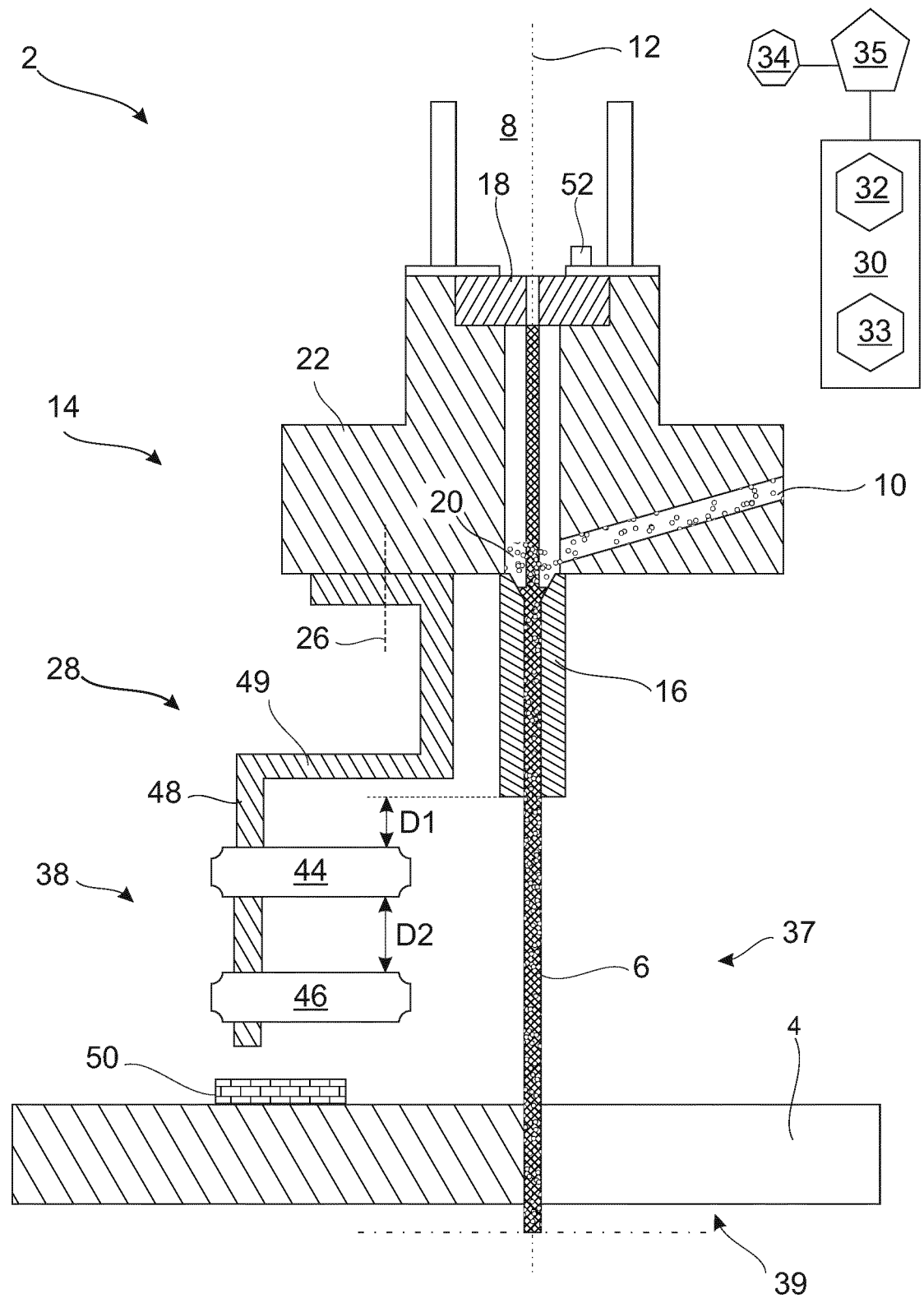
FIG. 9 provides a schematic illustration of a cut through an AWJ system in accordance with a third preferred embodiment of the invention.

FIG. 9 shows a cross section of an abrasive waterjet cutting system 2 in accordance with a sixth embodiment of the invention. The sixth embodiment of the invention is substantially similar to the fourth embodiment. The sixth embodiment may be essentially free of the accelerometers which have been previously presented.

The abrasive waterjet cutting system 2 is represented above a workpiece 4 which is currently cut by the abrasive cutting waterjet 6. The current cross section is taken along the cut-out of the workpiece 4 which is represented with hatchings before the kerf, and which is hatching free on the kerf created by the abrasive cutting waterjet 6. Despite the workpiece 4 is represented under the abrasive waterjet cutting system 2, it is encompassed in the current invention any other orientation. For instance, the workpiece 4 may be beside the abrasive waterjet cutting system 2, and the abrasive cutting waterjet 6 may flow horizontally.

The abrasive waterjet cutting system 2 may include a high-pressure fluid source 8, notably a high-pressure water source or high-pressure water vessel. In the current figure, the high-pressure fluid source 8 is arbitrarily cut and may extend further upstream. Similarly, the cutting abrasive waterjet 6 is arbitrarily interrupted downstream the workpiece 4 for representation purpose, and may flow further downstream, notably in a through cut configuration. The high-pressure fluid source 8 is adapted for providing the fluid at a pressure ranging from 2500 bars to 6900 bars. For instance, the fluid pressure is about 4000 bars. The abrasive waterjet cutting system 2 may also comprise an abrasive particle supply 10.

The abrasive waterjet cutting system 2 exhibits an abrasive waterjet flow direction 12 and an abrasive waterjet cutting head 14 with a nozzle 16 adapted for guiding the abrasive waterjet 6 along the abrasive waterjet flow direction 12 and transferring momentum from fluid to particles. The nozzle 16 is also known as a "focussing tube".

The abrasive waterjet flow direction 12 may be considered as a geometrical axis. It is directed from the abrasive waterjet cutting head 14 toward the workpiece 4. It projects beyond the workpiece 4 and the abrasive waterjet cutting system 2. It may be colinear with the abrasive cutting waterjet 6.

An orifice 18 may be in fluid communication with the high-pressure fluid source 8. It may guide a high-speed waterjet toward the nozzle 16. Upstream the orifice 18, water may have a high-pressure, and downstream the orifice 18 it may have a high-speed. The high-speed water jet may be a single-phase water jet. The high-speed water jet may accelerate the abrasive particles received in a mixing chamber 20. More precisely, the acceleration of particles is provided by momentum transfer with the high-speed water jet, and the momentum transfer may essentially take place in the nozzle 16. The abrasive waterjet cutting system 2 may be adapted such that the abrasive cutting waterjet 6 reaches a speed in the range of 300-1200 m/s downstream the nozzle 16. The abrasive cutting waterjet 6 may be a three phases waterjet, and may include water, air and particles in suspension. The abrasive waterjet cutting head 14 may include a main support 22. The main support 22 may bear the orifice 18, and/or may be in contact with the high-pressure fluid source 8. The mixing chamber 20 may be formed therein. The abrasive particle supply 10 may cross it.

In order to assess the functioning of the abrasive waterjet cutting system 2, a monitoring device 28 is provided. The latter is adapted for monitoring at least one characteristic of the abrasive waterjet 6 or the characteristics of the abrasive waterjet 6. The abrasive jet characteristic may be a feature strictly depending on the acoustic pressure it generates and can be related to the quality of the cut it produces. In other words: the sound generated by the waterjet is measured, from a feature is extracted, and according to that feature it may be monitored whether the cut is good or compromised.

The monitoring device 28 may be connected to a computer 30 in order to process signals. More precisely, the computer 30 may include a computer readable medium 32 on which a computer program is stored, and a central processing unit (CPU) 33 which is adapted for carrying out the instructions of the computer program. The monitoring device 28 may include a preamplifier 34 connected to the computer 30, and amplifying electric signals from sensors, notably the sensors as set forth below. An acquisition board 35 with an A/D converter may connect the preamplifier 34 to the computer 30.

The abrasive waterjet cutting system 2 may exhibit a workpiece reception area 39. The workpiece reception area 39 may enclose fixation elements (not represented) for fixing the workpiece 4 to the framework of the system 2.

A downstream set 38 of sensors may include microphones (44; 46), notably an upstream microphone 44 and a downstream microphone 46. At this location, the microphones (44; 46) are sensitive to the sound produced by the workpiece 4. Within the corresponding set, the upstream microphone 44 is the nearest from the nozzle outlet whereas the downstream microphone 46 is the nearest from the workpiece 4.

These microphones (44; 46) are arranged between the lower end of the nozzle 16 and the upper face of the workpiece 4. Thus, the microphones (44; 46) may be arranged in the cutting area 37. The microphones (44; 46) are adapted for measuring acoustic pressure downstream the abrasive waterjet cutting head 14, and in turn for measuring sound generated by the abrasive cutting waterjet 6 which permits to obtain a jet characteristic.

The abrasive waterjet cutting system 2 may include a frame 48. The frame 48 receives the upstream microphone 44 and the downstream microphone 46. The frame 48 may include a transversal portion 49. This transversal portion 49 may project perpendicularly from the abrasive waterjet flow direction 12, and/or from the abrasive cutting waterjet 6. The transversal portion 49 permits to set a fixed distance between the microphones and the abrasive cutting waterjet 6.

The frame 48 may be fixed to the main casing 22 by means of reversible fixation means 26, which indirectly permit to fix the upstream microphone 44 and the downstream microphone 46 to the main casing 22.

The frame 48 is adapted for maintaining a constant distance D2 between the microphones (44; 46). This distance D2 may be larger than a distance D1 between the outlet end of the nozzle 16 and the upstream microphone 44. This means that, along the abrasive waterjet flow direction 12, the upstream microphone 44 may closer to the nozzle 16 than to the downstream microphone 46. The distances (D1; D2) may be considered along the abrasive waterjet flow direction 12. The abrasive waterjet cutting system 2 may comprise a workpiece sensor, notably a piezoelectric sensor 50. The piezoelectric sensor 50 may be added to the abrasive waterjet cutting system 2. The piezoelectric sensor 50 is adapted for measuring vibrations. It may be associated with the workpiece 4, and may notably be fixed thereon on the face in front of the abrasive waterjet cutting head 14. In this configuration, the piezoelectric sensor 50 permits to sense vibrations generated and/or borne by the workpiece 4; notably in response to the cutting operation of the abrasive cutting waterjet 6.

The abrasive waterjet cutting system 2 may enclose an orifice sensor 52. The orifice sensor 52 may be upstream the orifice 18. The position in the current figure is merely illustrative. The orifice sensor 52 is structurally and functionally adapted for measuring the fluid pressure upstream the orifice 18. The orifice sensor 52 may be a strain gauge sensor, for instance adapted for measuring pressure applied on its support. The pressure upstream the orifice 18 may then be estimated, notably in order to estimate the orifice wear.

Figure 10:
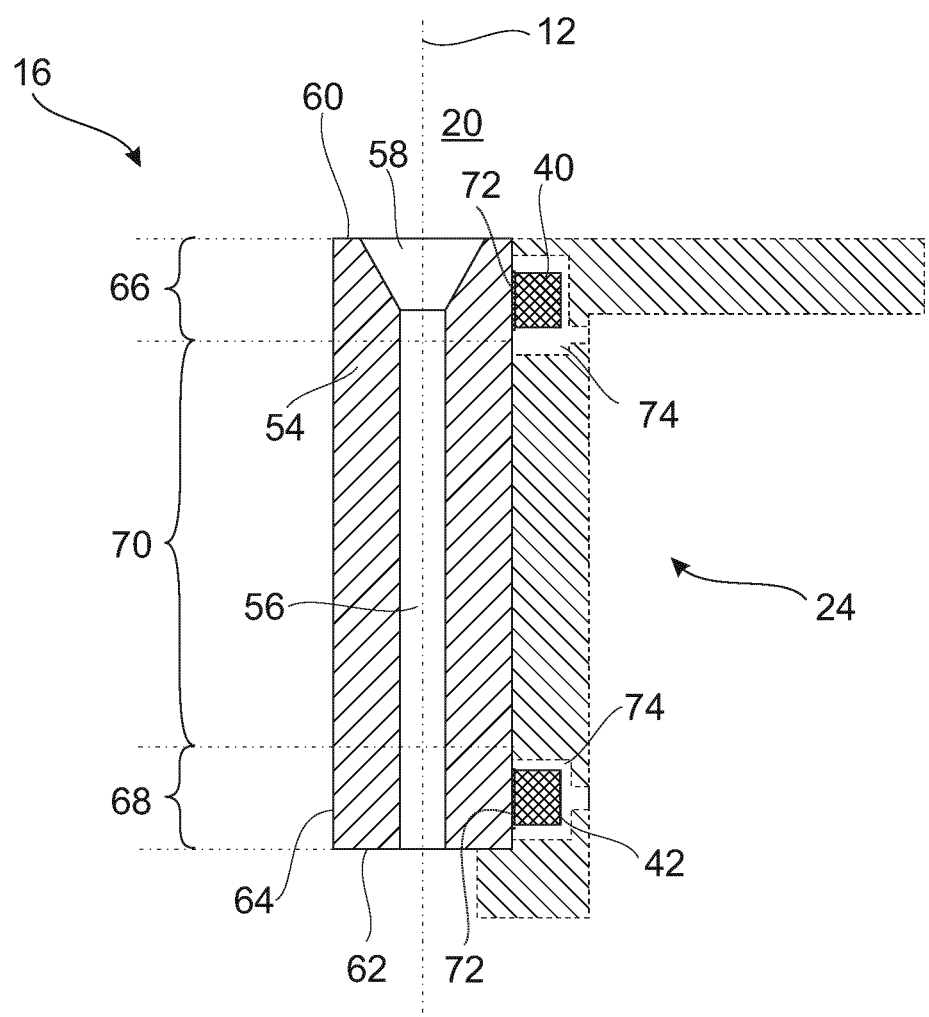
FIG. 10 provides a schematic illustration of a nozzle in accordance with a preferred embodiment of the invention.

FIG. 10 shows a nozzle 16 for an abrasive waterjet cutting system, for instance an abrasive waterjet cutting system similar or identical to the ones described in relation with FIGS. 1 to 3 and/or FIGS. 7 to 9. The nozzles of FIGS. 1 to 3 and/or FIGS. 7 to 10 may be similar or identical. For the sake of clarity, only a portion of the casing 24 is represented with dotted lines.

The nozzle 16 essentially comprise a tubular body 54. In order to resist to abrasion and erosion from abrasive particles, the body 54 may be formed from of an essentially hard material. Tungsten carbide may be used. The nozzle may exhibit a passage 56 through the tubular body 54, for instance a straight passage. The passage 56 may be colinear with the abrasive waterjet flow direction 12. In the current view, the passage 56 is arranged vertically. The passage 56 may present a conical portion forming a hoper 58 communicating with the mixing chamber 20.

The nozzle 16 exhibits an inlet end 60 and an outlet end 62 which are disposed upstream and downstream respectively, and which are joined by the cylindrical outer surface 64 of the nozzle 16. The nozzle 16 exhibits two opposite end sections, notably an upstream section 66 and a downstream section 68, in contact of the inlet end 60 and of the outlet end 62 respectively. Each section may project along at most: 20%, or 10%, of the length of the nozzle 16. These sections (66; 68) may be separated by a central section 70, which may extend along the majority of the nozzle length, for instance along at least: 70%, or 80% of the nozzle 16. The central section 70 may be sensor free. The length may be measured along the abrasive waterjet flow direction 12.

The upstream section 66 and the downstream section 68 may both receive a sensor, notably an upstream sensor or a downstream sensor. The sensors may be in contact of the cylindrical outer surface 64. Each sensor may be centred with respect to the corresponding section (66; 68). These sensors may correspond to the upstream accelerometer 40 and to the downstream accelerometer 42. The sensors may be held in position by screws (not represented) engaging the casing 24.

Alternatively, or in addition; the sensors may be held by adhesive 72 at the interface with the cylindrical outer surface 64.

The casing 24 may exhibit pockets 74, for instance an upstream pocket and a downstream pocket receiving the upstream accelerometer 40 and the downstream accelerometer 42 respectively. The pockets 74 may be open on the nozzle 16. They may also exhibit apertures at the opposite for wirings (not represented). The inner surfaces of the pockets 74 may be distant from the sensors. Consequently, the pockets 74 may be free of contact with the sensors in order to not interfere with their measurements.

Figure 11:
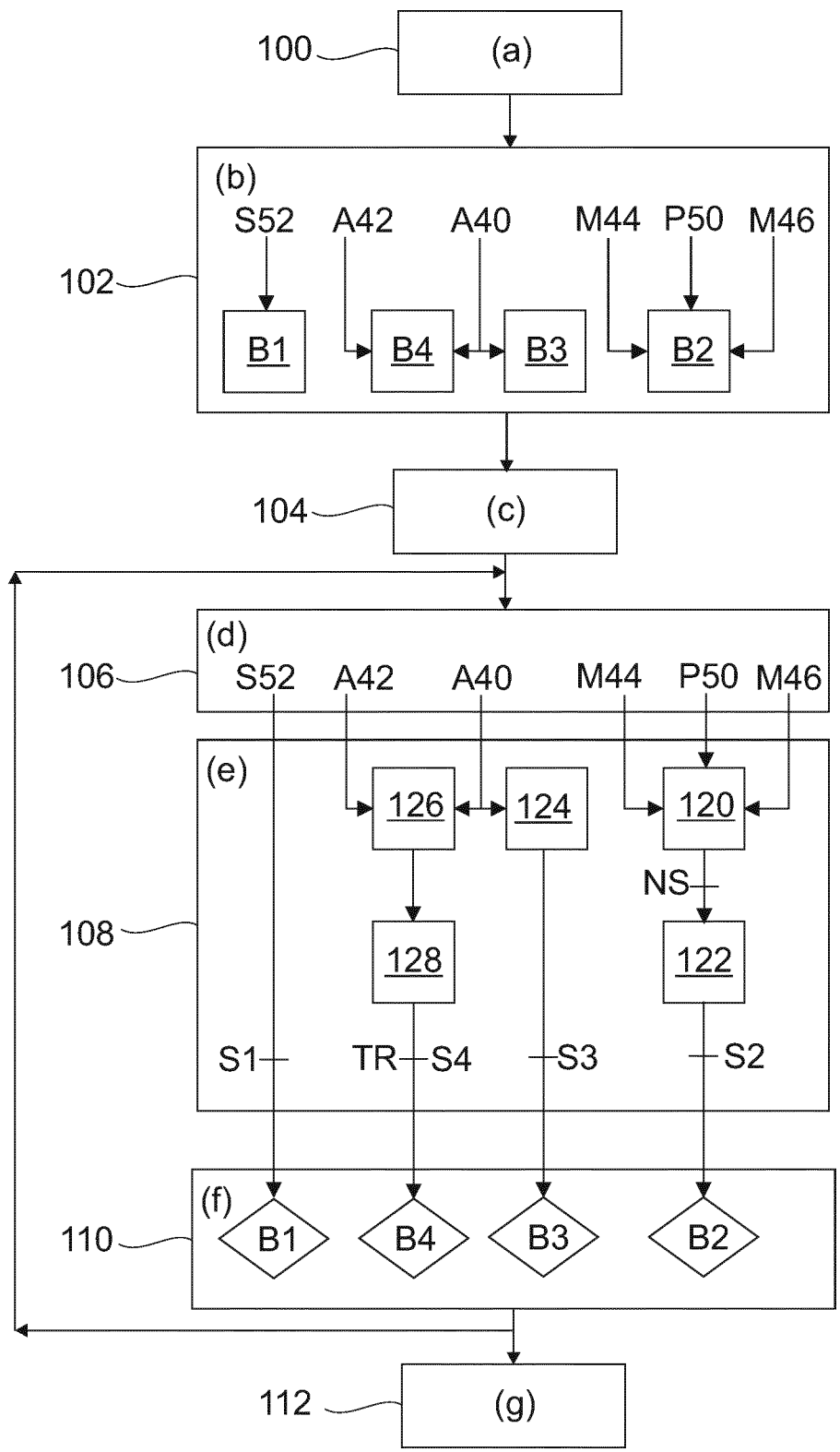
FIG. 11 provides a schematic illustration of a monitoring process in accordance with a preferred embodiment of the invention.

FIG. 11 provides a schematic illustration of a monitoring process of an abrasive waterjet cutting system. The abrasive waterjet cutting system may correspond to one of those described in relation with FIGS. 1 to 3 and/or 7 to 10.

The monitoring process may include the following steps, notably performed in the following order:
(a) maintenance 100 of the abrasive waterjet cutting head;
(b) defining 102 a benchmark of the abrasive waterjet cutting head by means of at least one of the upstream sensor and the downstream sensor;
(c) cutting 104 a workpiece with the abrasive waterjet;
(d) measuring 106 an upstream data and a downstream data with the upstream sensor and the downstream sensor respectively;
(e) processing 108 the upstream data and/or the downstream data in order to define a signature of the abrasive waterjet cutting head;
(f) comparing 110 the signature to the benchmark;
(g) producing 112 one or more output signals.

Step (a) maintenance 100 may comprise the mounting of a new nozzle, or the replacement of a worn nozzle by an unworn one. Step (a) maintenance 100 may include a correction of the alignment between the nozzle and the orifice. Alternatively or in addition, step (a) maintenance 100 may comprise a replacement of the orifice and/or a tightening of any screw connection.

At step (b) defining 102 a benchmark, the benchmark may be defined by means of in situ measurements. The measurements may be obtained by one of the sensors, notably one of the microphones and/or one of the accelerometers. If necessary, the benchmark may be determined by means of the orifice sensor, and/or the piezoelectric sensor.

Accordingly, the benchmark may be defined by at least one of, or any combination of the followings: an inlet signal A40 from the upstream accelerometer, an outlet signal A42 from the downstream accelerometer, an upstream signal M44 from the upstream microphone, a downstream signal M46 from the downstream microphone, a workpiece signal P50 from the piezoelectric sensor, and an orifice signal S52 from the orifice sensor.

At step (b) defining 102, the benchmark may enclose several sub-benchmarks. For instance, the benchmark may enclose a first benchmark B1, a second benchmark B2, a third benchmark B3, a fourth benchmark B4, a fifth benchmark, and so on. Each of these sub-benchmarks may be representative, independently, from one characteristic of the abrasive waterjet cutting system.

In addition, the benchmarks (B1-B4) may be calculated for one operating setpoint of the AWJ head as for a group of setpoints. This group of setpoints may form an Operation Space Domain (OSD). The OSD may enclose any setpoint expected during operation. The OSD may reduce to one point if the head is expected to operate only at one single setpoint.

Step (b) defining 102 may comprise a training period during which the benchmarks (B1-B4) are calculated for each setpoint of the OSD. During the training period, the set point is varied within certain discrete points of OSD in order to explore it with sufficient resolution, and the correspondent benchmark may be recorded. Then, a general benchmark may be defined. The training period may be considered as an initial calibration, for instance carried out immediately after installation of a new nozzle. At step (f) comparing 110, the signature is compared against the corresponding benchmark for the instantaneous setpoint used at step (c) cutting 104.

The first benchmark B1 may be defined by means of the orifice sensor. The second benchmark B2 may be defined by means of the upstream microphone, the downstream microphone, and optionally the workpiece sensor. The third benchmark B3 may be defined by means of the upstream accelerometer. The fourth benchmark B4 may be defined by means of the upstream accelerometer and the downstream accelerometer. The benchmarks B1-B4 may be calculated by means of the computer, on previous signals which are eventually amplified, then acquired synchronously and A/D converted by means of acquisition board.

Alternatively, the benchmark may be theorical. It may correspond to a stored benchmark. Step (d) measuring 106 may be continuous. Acquisition and A/D converting may also be continuous. Thus signal(s) may be continuously provided. The signals may be synchronized, and may form windowed signals. It may be understood that the windowed signals are signals of fixed time length.

At step (e) processing 108, the signature may encompass several sub-signatures, for instance a first signature S1, a second signature S2, a third signature S3, a fourth signature S4, and so on. At least step (d) measuring 106, step (e) processing 108 and step (f) comparing 110 may be performed during step (c) cutting 104. Thus, the monitoring process may run continuously during cutting operations, and may go on running provided conformity requirements are met. Otherwise, step (g) producing 112 may be triggered during step (c) cutting 104.

Step (e) processing 108 may start every minute or every 20 seconds on the windowed signals within that time interval. For instance, windowed signals measured during 20 second are selected, and then processed in order to provide (a) corresponding signature(s). Thereafter, next windowed signals of 20 second are selected and processed. This may be repeated continuously, meaning that the monitoring is continuous. 20 seconds windows may be comprised between time resolution and frequency resolution.

Step (d) measuring 106 may comprise a measurement of the pressure upstream the orifice. The orifice signal S52 from the orifice sensor may be used.

Subsequently or simultaneously, step (e) processing 108 may comprise computing the static pressure and the dynamic pressure by means of Fourier Transform or Wavelet Transform. The latter may form the first signature S1. The first signature S1 may comprise a portion corresponding to the static pressure, and another portion corresponding to the dynamic pressure. Step (f) comparing 110 may comprise the comparison of said Fourier Transform or Wavelet Transform—the first signature S1—to the first benchmark B1. The result may inform about the current orifice wear.

During step (d) measuring 106, sound pressures may be measured by the microphones. Their upstream signal M44 and their downstream signal M46 may be used.

During step (e) processing 108, a calculation step 120 may provide a net signal NS on the basis of the signals M44 and M46. The net signal NS may carry information about the acoustic contribution of the abrasive waterjet from which the contribution from the workpiece is removed. In a general way, it may be considered that the contribution of the environment is removed from the acoustic contribution of the abrasive waterjet. A decorrelation technique may be used for computing the net signal, notably by a Singular Value Decomposition (SVD) algorithm. The pressure emitted by the abrasive waterjet may be isolated, and its quality may be precisely assessed.

During step (e) processing 108, a further calculation step 122 may compute the Fourier Transform or the Wavelet Transforms of the net signal NS. An Auto-Regressive Moving Average (ARMA) of the net signal NS may be computed and used for computing the Fourier Transform or the Wavelet transform in order to provide an output, notably a signature or a part of a signature. The calculation step 122 may provide the second signature S2.

Alternatively or in addition, a workpiece signal P50 from the piezoelectric sensor may be used. This workpiece signal P50 may be used during the calculations step 120. The net signal NS may be calculated by a decorrelation technique, for instance with a Singular Value Decomposition (SVD) algorithm. Similarly, the net signal NS may carry information about acoustic contribution of waterjet from which the contribution from workpiece, and more generally the contribution of the environment, is removed. Then, the workpiece signal P50 may also be used for the computation of the second signature S2.

During step (f) comparing 110, the second signature S2 is compared to the second benchmark B2. The result of this comparison may provide teaching about the characteristic of the abrasive waterjet, notably the quality of the cut it produces.

During the step (d) measuring 106, accelerations of the nozzle may be measured by the accelerometers. The inlet signal A40 and the outlet signal A42 may be used.

During step (e) processing 108, a calculation step 124 may provide Fourier or Wavelet Transform of the inlet signal A40. The Fourier transform or Wavelet Transform can be eventually computed on the ARMA estimate of the signals. This Fourier transform or Wavelet Transform may form a signature or a part of a signature. It may be a third signature S3, which may notably be compared to the third benchmark B3.

Due to the location of the upstream accelerometer, the third signature S3 may be correlated to jet-impinging conditions at the inlet section of the nozzle, and therefore to an eventual misalignment between the orifice and the nozzle. This misalignment may result from wear of the orifice, or from an misalignment of components during operation. The inlet signal A40 may be used, for instance alone.

During step (e) processing 108, a calculation step 126 may provide the Fourier Transforms or the Wavelet Transform of the upstream signal A40 and of the downstream signal A42. Through these Fourier Transforms (FTs) or Wavelet Transforms (WTs), a further calculation step 128 may provide the vibration transmissibility TR between the inlet and the outlet of the nozzle, for instance the vibration transmissibility TR between the inlet section and the outlet section of the nozzle. The vibration transmissibility TR may be obtained by dividing the Fourier Transform or Wavelet Transform of the upstream signal A40 by the Fourier Transform or Wavelet Transform of the downstream signal A42. In other words, the transmissibility TR may be computed as the ratio between the two spectra from Fourier Transforms of the accelerometer signals.

Such transmissibility TR is a structural feature of the nozzle; therefore, it may be correlated to its wear condition. The transmissibility TR may be considered as a signature or a part of the signature. It may be a fourth signature S4, and may be compared to the fourth benchmark B4 in order to control the nozzle wear.

As apparent from the current description, step (b) defining 102 and step (d) measuring 106 may use the same signals A40, A42, M44, M46, P50 and S52. However, these steps compute the signals at different periods. These signals may change due to step (c) cutting 104, and due to the changing characteristics of the abrasive waterjet cutting system.

According to an option of the invention, each benchmark (B1-B4) may be calculated by means of the same calculation step(s) as its associated signature (S1-S4). An associated signature may be a signature to which a benchmark is compared.

Thus, the second benchmark B2 may be calculated on the basis of the signals M44, M46 and possibly M50, and by means of the calculation step 120 and the further calculation step 122 as set forth above. The calculation step 120 may be performed provided the workpiece is disposed in the abrasive waterjet cutting system. If the benchmark is calculated without workpiece, the calculation step 120 may be by-passed.

The third benchmark B3 may be calculated on the basis of the signal A40 and the calculation step 124 as set forth above. The fourth benchmark B4 may be calculated on the basis of the signals A40 and A42, and through the calculation step 126 and the calculations step 128 as set forth above.

The monitoring process may be an iterative monitoring process. It may repeat the calculations of signatures during step (e) processing 108, and the comparison of the signatures to their associated benchmarks during step (f) comparing 110. Yet, the measures of signals during step (d) measuring 106, may be continuous.

In a general way, N signatures are compared against the respective benchmarks (N represents a naturel number). And N output digital signals are outputted according to the comparison and they can be used for deciding whether performing maintenance or not, what kind of maintenance eventually, and/or controlling.

The monitoring process performs step (g) producing 112 an or several output signal(s) only if the signature exceeds a tolerance with respect to the benchmark. The output signal, for instance a digital signal, is notably used for controlling or correcting a set point of the abrasive waterjet cutting head, or notably used for deciding a maintenance intervention.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A machining system comprising:
a machining apparatus, comprising a cutting machine, said machining apparatus being adapted for machining a workpiece, the machining apparatus comprising a nozzle having an inlet end and an outlet end;
a monitoring device adapted for monitoring machining conditions of the machining apparatus, the monitoring device comprising a plurality of sensors, said plurality of sensors comprising:
a first sensor configured to be disposed at a first location downstream of the inlet end and a second sensor configured to be disposed at a second location downstream of the inlet end which is distant from the first location.

2. The machining system of claim 1, wherein the first sensor comprises a first strain gauge sensor, and the second sensor comprises a second strain gauge sensor.

3. The machining system in accordance with claim 2, wherein the plurality of sensors further comprise a third strain gauge sensor at a third location which is distant from the first location and the second location, and a fourth strain gauge sensor configured to be in contact of the workpiece.

4. The machining system in accordance with claim 1, wherein the first sensor comprises a first accelerometer or a strain gauge sensor, the second sensor comprises a second accelerometer or strain gauge sensor, the plurality of sensors further comprising an array of microphones which is at another location which is distant from the first location and the second location.

5. The machining system in accordance with claim 1, wherein the machining apparatus comprises a guide for cutting, the first location is at a first distance from the guide, and the second location is at a second distance from the guide; the second distance being at least two times larger than the first distance.

6. The machining system in accordance with claim 1, wherein the machining apparatus is at least one of: an abrasive waterjet cutting system, a milling machine, a lathe machine, a press machine, or a sparkplug machining machine.

7. A monitoring method of a machining system, comprising a machining apparatus (202), comprising a cutting machine, adapted for machining a workpiece, the machining apparatus comprising a nozzle having an inlet end and an outlet end, and a monitoring device which monitors machining conditions of the workpiece and/or the machining apparatus, the monitoring device comprising a plurality of sensors, said plurality of sensors comprising a first sensor at a first location downstream of the inlet end, and a second sensor at a second location downstream of the inlet end distant from the first location which provide a first signal, a second signal respectively,
the monitoring method comprising the steps of:
defining, by the monitoring device, a first signature, comprising a first benchmark signature based on at least the first signal and the second signal;
machining, by the machining apparatus, the workpiece;
measuring, by the monitoring device, the machining conditions of the workpiece and/or of the machining apparatus by the plurality of sensors;
computing, by the monitoring device, a second signature based on at least the first signal and the second signal measured during the machining;
comparing, by the monitoring device, the first signature against the second signature; and
communicating a message to a user based on the comparing.

8. The monitoring method in accordance with claim 7, wherein the first signature comprises numerical data.

9. The monitoring method in accordance with claim 7, wherein:
during the step of computing the second signature, the first signal and the second signal are continuously provided, and
the second signature is computed and/or the first signature is defined using at least: a first portion of finite length of the first signal, and a second portion of finite length of the second signal, the first portion and the second portion starting at the same time and having a same time length.

10. The monitoring method in accordance with claim 7, wherein the first sensor comprises a first strain gauge sensor, and the second sensor comprises a second strain gauge sensor.

11. The monitoring method in accordance with claim 10, wherein defining the first signature and computing the second signature comprises calculation, by the monitoring device, of vibration transmissibilities between the first strain gauges sensor and the second strain gauge sensor, said vibration transmissibilities being part of the first signature and of the second signature.

12. The monitoring method in accordance with claim 7, wherein:
the machining apparatus comprises a cutting tool with a cutting edge,
the plurality of sensors comprising a tool sensor providing a tool signal, and
defining the first signature and computing the second signature is also based on the tool signal.

13. The monitoring method in accordance with claim 7, wherein:
the plurality of sensors comprise a workpiece sensor providing a workpiece signal, and
defining the first signature and computing the second signature is also based on the workpiece signal.

14. The monitoring method in accordance with claim 7, wherein:
computing the second signature and/or defining the first signature comprises calculation of a Fourier Transform or a Wavelet Transform of the first signal and the second signal, said Fourier Transform or Wavelet Transform of each signal from the plurality of sensors being part of the first signature and of the second signature; and
the method further comprises filtering, by the monitoring device, the first signal and the second signal with an anti-leakage filter and/or an anti-aliasing filter in order to provide filtered signals.

15. The monitoring method in accordance with claim 7, wherein:
at least the first sensor and the second sensor comprise microphones, and
computing the second signature and defining the first signature comprises calculation of a clean signal of the first signal through a blind separation technique or an acoustic beamforming.

16. The monitoring method in accordance with claim 7, wherein:
the plurality of sensors comprise an array of microphones providing an array of signals, and
computing the second signature and defining the first signature comprises an acoustic beamforming technique for space localization and characterization of acoustic sources on a computation grid, said computation grid corresponding to a work plan of the machining apparatus.

17. The monitoring method in accordance with claim 7, wherein the plurality of sensors comprise strain gauge sensors, providing a plurality of signals, the first signature and the second signature being each computed, by the monitoring device, from said plurality of signals.

18. The monitoring method in accordance with claim 7, wherein:
comparing the first signature against the second signature comprises determining a potential deviation between the first signature and the second signature.

19. The monitoring method in accordance with claim 7, further comprising:
performing a training period during which machining conditions of the machining apparatus are changed, by the monitoring device, in order to change the first signal and the second signal, and in order to create a library of first benchmark signatures, the first benchmark signatures of the library being defined at least based on the first sensor and the second sensor.

20. The monitoring method in accordance with claim 19, further comprising:
selecting a first benchmark signature from the library, the selected first benchmark signature of the library being the one with the smallest difference between its machining conditions and the machining conditions corresponding to the second signature and/or between features of the first signature (FS 1; FS2; FS3) and features of the second signature.

21. A non-transitory computer readable medium having instructions stored thereon that, when executed by a computer, cause the computer to perform operations of the method according to claim 7.

* * * * *